United States Patent [19]

Itoh et al.

[11] Patent Number: 5,358,833
[45] Date of Patent: Oct. 25, 1994

[54] AMORPHOUS PHTHALOCYANINE COMPOUND OR MIXTURE OF AMORPHOUS PHTHALOCYANINE COMPOUNDS, AND METHOD FOR PREPARING SAME

[75] Inventors: Hisato Itoh; Takahisa Oguchi; Shin Aihara; Kenichi Sugimoto, all of Yokohama, Japan

[73] Assignees: Mitsui Toatsu Chemicals, Inc., Tokyo; Yamamoto Chemicals, Inc., Yao, both of Japan

[21] Appl. No.: 901,035

[22] Filed: Jun. 19, 1992

[30] Foreign Application Priority Data

Jun. 21, 1991 [JP] Japan ................. 3-150553
Jun. 21, 1991 [JP] Japan ................. 3-150554
Sep. 6, 1991 [JP] Japan ................. 3-227054

[51] Int. Cl.$^5$ ............................................. G03C 1/735
[52] U.S. Cl. ........................... 430/495; 430/945; 540/136; 540/141; 252/587
[58] Field of Search ............ 430/495, 945; 540/136, 540/140, 141; 252/587

[56] References Cited

U.S. PATENT DOCUMENTS

| | | | |
|---|---|---|---|
| 4,239,549 | 12/1980 | Fabian et al. | 540/141 |
| 4,298,975 | 11/1981 | van der Veen et al. | 369/94 |
| 4,769,307 | 9/1988 | Ozawa et al. | 430/270 |
| 4,882,427 | 11/1989 | Enokida et al. | 540/141 |
| 4,946,762 | 8/1990 | Albert et al. | 430/270 |
| 5,124,067 | 6/1992 | Itoh et al. | 252/299.2 |

FOREIGN PATENT DOCUMENTS

| | | |
|---|---|---|
| 0373643 | 6/1990 | European Pat. Off. . |
| 0384470 | 8/1990 | European Pat. Off. . |
| 0409737 | 1/1991 | European Pat. Off. . |
| 2085008 | 12/1971 | France . |
| 62-275272 | 11/1987 | Japan ................. 540/136 |
| 63-312364 | 12/1988 | Japan ................. 540/140 |

OTHER PUBLICATIONS

Patent Abstracts of Japan, vol. 10, No. 362, "Production of Metal Phthalocyanine Crystal" (Dec. 1986), Haruta Masahiro et al.
Patent Abstracts of Japan, vol. 13, No. 362, "Production of Amorphous Titanium Phthalocyanine Compound", (Sep. 1989), Enokida Toshio.

*Primary Examiner*—Charles L. Bowers, Jr.
*Assistant Examiner*—John A. McPherson
*Attorney, Agent, or Firm*—Oblon, Spivak, McClelland, Maier & Neustadt

[57] ABSTRACT

There are here disclosed an amorphous alkoxyphthalocyanine which is a compound or a mixture of compounds represented by the formula (1) shown in claim 1; and a method for preparing this amorphous alkoxyphthalocyanine which comprises the step of heating a crystalline phthalocyanine compound or a mixture of crystalline phthalocyanine compounds in an organic solvent.

22 Claims, 23 Drawing Sheets

AMORPHOUS PHTHALOCYANINE COMPOUND OR MIXTURE OF AMORPHOUS PHTHALOCYANINE COMPOUNDS, AND METHOD FOR PREPARING SAME

BACKGROUND OF THE INVENTION

Field of the Invention

The present invention relates to an amorphous phthalocyanine compound or a mixture of amorphous phthalocyanine compounds in which a crystal form is regulated and which has excellent solubility, and it relates to methods for preparing them. The amorphous phthalocyanine compound or the mixture of the amorphous phthalocyanine compounds of the present invention are useful as near infrared absorption filters, liquid crystal display elements and record/memory materials such as write-once=type optical recording mediums.

Description of the Prior Art

Techniques for applying phthalocyanine derivatives, particularly alkoxyphthalocyanine derivatives to record layers of record/memory materials, particularly optical recording media such as optical discs are well known from Japanese Patent Laid-open Nos. 197280/1986, 246091/1986, 39286/1987 (USP 4,769,307), 37991/1988 and 39388/1988, and other publications. However, phthalocyanines are usually poor in solubility in organic solvents, particularly hydrocarbon solvents having a low polarity, and therefore it is difficult to form thin films by applying the solutions of the phthalocyanines.

On the other hand, Japanese Patent Laid-open Nos. 221461/1989, 50554/1991 and 50555/1991 disclose that the crystallization of the phthalocyanine is accelerated by a solvent treatment or a heat treatment.

For the purpose of solving such problems, the present inventors have developed alkoxyphthalocyanine derivatives as record materials for optical discs, particularly record materials for CD-R which are described in Japanese Patent Laid-open No. 62878/1991, and they have found that in order to apply the alkoxyphthalocyanine derivatives by a spin coating process which is one of solution coating techniques, the optimum concentration of a coating solution is in the range of from 15 g/l to 90 g/l. However, it have also been found that some of the above-mentioned alkoxyphthalocyanine derivatives have a low solubility, depending upon a crystal form, so that they cannot be dissolved up to the optimum concentration, or even once they can be dissolved, they precipitate in a short period of time, so that the coating solutions having a necessary concentration cannot be prepared.

The present inventors have found that the deterioration of the solubility is caused by the association of the alkoxyphthalocyanine. That is, it can be presumed that the association causes crystallization to proceed, and as a result, the solubility in a solvent deteriorates, or that the association causes precipitation from a dissolving state. In particular, a small amount of the association functions as the nucleus of the larger association, and therefore it is necessary to completely remove the association

SUMMARY OF THE INVENTION

The present inventors have intensively researched a technique of cleaving an association state of an alkoxyphthalocyanine derivative, and as a result, they have found that when the alkoxyphthalocyanine derivative is heated in an organic solvent and the used solvent is then distilled off, the alkoxyphthalocyanine derivative having an improved solubility can be obtained. Thus, the present invention has been attained on the basis of this discovery. The present invention, which is different from inventions of Japanese Patent Laid-open Nos. 221461/1989, 50554/1991 and 50555/1991, is characterized by a novel knowledge that the amorphous state of the alkoxyphthalocyanine derivative can be accelerated by heating phthalocyanine molecules in a solvent.

In the case that after the heat treatment, the solvent is distilled off from a dyestuff solution having a unimolecular dispersion state, it is necessary that the solvent is completely distilled off in a short period of time, because the dyestuff begins to associate, if the state of the concentrated solution is kept for a long period of time. The present inventors have found that an amorphous alkoxyphthalocyanine derivative having an improved solubility can be obtained by a vacuum freeze-drying process in which the association of the alkoxyphthalocyanine derivative is cleaved, and its solution is then frozen to solidify it in a unimolecular state, followed by heating the freezed material under reduced pressure to sublimate a used solvent. In consequence, the present invention has been achieved.

That is, the present invention is directed to an amorphous alkoxyphthalocyanine which is a compound or a mixture of compounds represented by the formula (1)

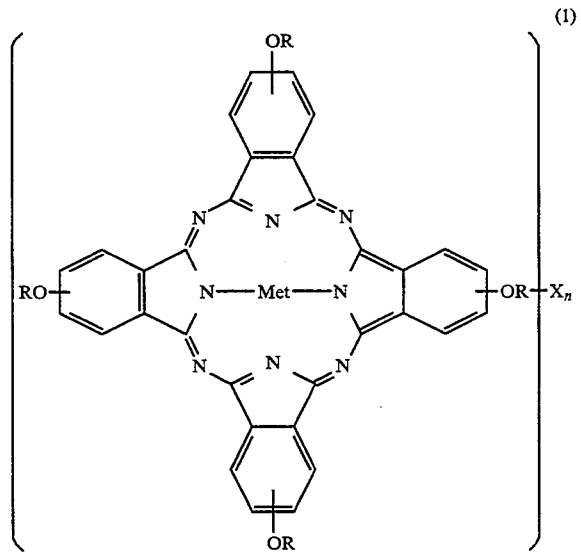

wherein R is a branched alkyl group; X is a halogen atom; n is the number of X and is from 0 to 4; and Met is a divalent metal atom, a trivalent or a tetravalent metallic derivative or an oxy metal, and the present invention is also directed to a method for preparing the same.

The amorphous phthalocyanine derivative of the present invention has a higher solubility in a solvent as compared with an untreated derivative and does not precipitate from its coating solution, and therefore it can be used to stably manufacture near infrared absorption filters and photorecord media.

DETAILED DESCRIPTION OF THE PREFERRED EMBODIMENTS

Figure 1:
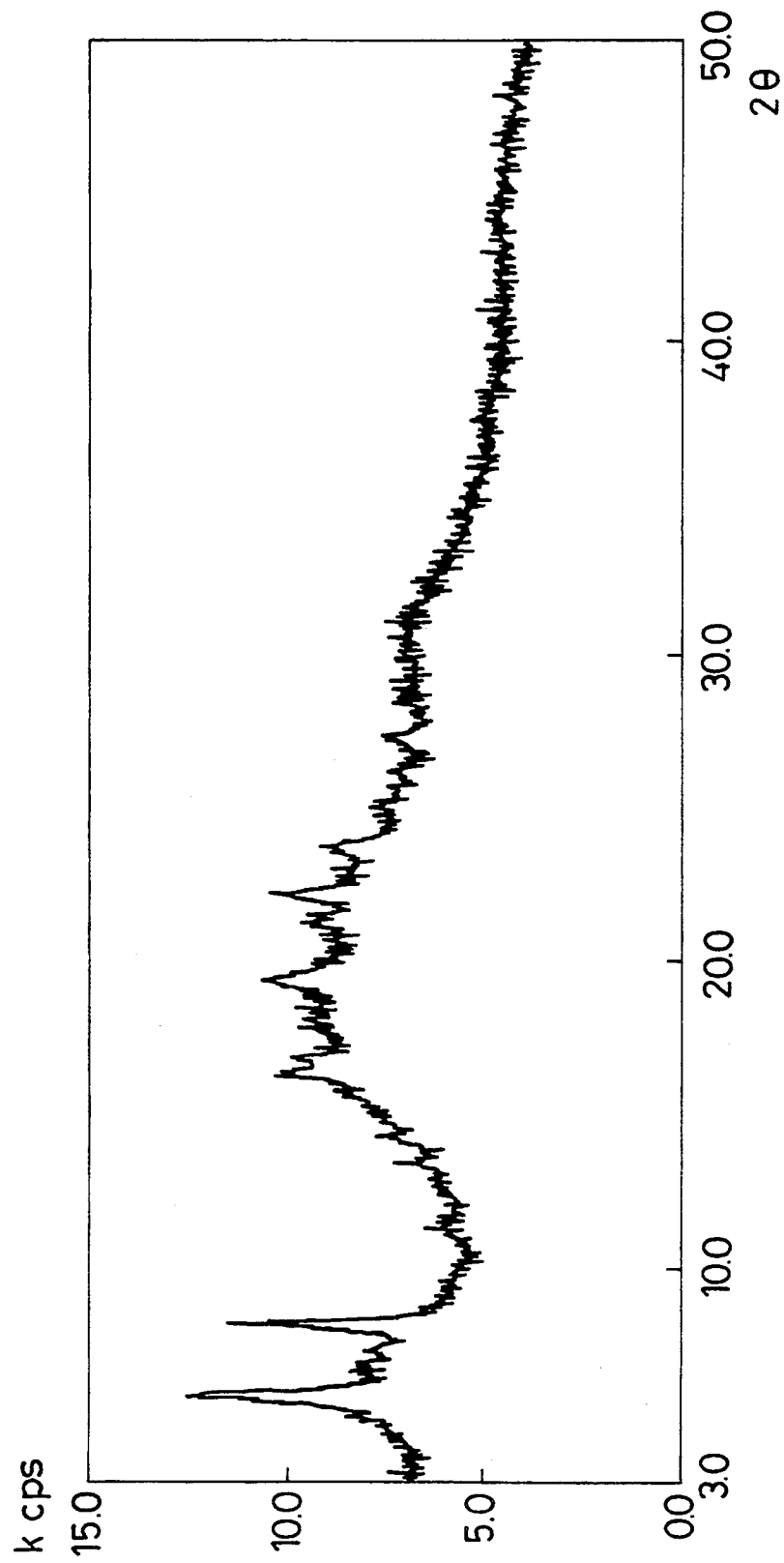
FIG. 1 is an X-ray diffraction pattern of an untreated phthalocyanine in Example 1.

An organic solvent which can be used in the present invention preferably meets requirements of (1) dissolving an alkoxyphthalocyanine derivative, and (2) having a boiling point of 50° C. or more, preferably 100° C. or more, for the purpose of converting a crystalline state into an amorphous state, i.e., cleaving association. Typical examples of the organic solvent include benzene, chloroform, carbon tetrachloride, 1,1-dichloroethane, 1,2dichloroethane, 1,1,1-trichloroethane, 1,2-trichloroethane, trichloroethylene, tetrahydrofuran, diisopropyl ether and dimethoxyethane, and preferable examples include toluene, ethylbenzene, isopropylbenzene, xylene, anisole, 1,1,2,2-tetrachloroethane, tetrachloroethylene, chlorobenzene, dichlorobenzene, 1,3,5-trichlorobenzene, 1-chloronaphthalene, 2-chloronaphthalene, bromobenzene, dibromobenzene, 1-methylnaphthalene, 2-methylnaphthalene, 1,4dioxane, di-n-butyl ether and diglyme.

Furthermore, in cleaving the association of a phthalocyanine, if there are considered two points of (1) a fact that when $\pi$—$\pi$ interaction and coordinate force of the solvent are utilized, an effect can be further increased, and (2) a requisite that after the cleavage of the association, the solvent must be rapidly removed, preventing reassociation, aromatic hydrocarbons having boiling points of from 100° to 200° C. are preferable, and examples of these aromatic hydrocarbons include toluene, ethylbenzene and xylene.

In order to remove the solvent by freeze-drying, three requirements are preferably met which are the above-mentioned requirements (1) and (2) for the organic solvent as well as (3) another requirement that a freezing point is −40° C. or more, preferably from 0 to 40° C. Typical examples of the organic solvent which can meet the three requirements include 1,2-dichloroethane, 1,1,1-trichloroethane, 1,1,2-trichloroethane, iodobenzene, bromobenzene, 1-methylnaphthalene, m-chlorotoluene, o-xylene, m-dichlorobenzene, carbon tetrachloride, tetrachloroethylene, 1,6-dimethylnaphthalene, 2,4-dichlorobenzene, $\alpha,\alpha$-dichlorotoluene, 3,4-dichlorotoluene, 2,4-dichlorotoluene, $\alpha,\alpha,\alpha$-trichlorotoluene, 1-chloronaphthalene and 1,2-dimethylnaphthalene, and preferable examples include benzene, p-xylene, 1-bromonaphthalene, p-chlorotoluene and p-dioxane.

Moreover, in view of the fact that the cleavage effect of the association of the phthalocyanine can be further increased by utilizing the $\pi$—$\pi$ interaction and the coordinate force of the solvent, and considering the easy freeze-drying after the cleavage of the association, an aromatic hydrocarbon having a boiling point of from 100° to 200° C. and a freezing point of 0° C. or more is preferable. Examples of such an aromatic hydrocarbon include benzene and p-xylene.

A temperature for a heat treatment is in the range of from 50° to 250° C., preferably from 100° to 200° C., and a time for the heat treatment is in the range of from 30 minutes to 10 hours, preferably from 1 to 5 hours. The concentration of phthalocyanine in the heat treatment is in the range of from 5 to 500 g/l, preferably from 10 to 300 gl.

Freeze-drying can be carried out as follows: A thermally treated solution is first cooled to room temperature (from 15 to 25° C.), and it is then placed in a freeze-dryer. Afterward, the solution is frozen by cooling the freeze-dryer under atmospheric pressure at a temperature of −50° C. or more, preferably from −40° to 0° C. in 120 minutes or less, preferably 60 minutes of less, and a heating medium for heating shelves in the freeze-dryer is then heated from −30° C. to 70° C., preferably from −30° C. to 40 °C. under reduced pressure, while heat is supplied as much as gasification latent heat, to sublimate and dry the freezed solvent. At this time, the internal pressure in the freeze-dryer is about 1000 mTorr or less, preferably about 500 mTorr or less, and in a final step of the drying process, it is preferably about 200 mTorr or less.

In the formula (1), a branched alkyl group represented by R is a hydrocarbon or a halogenated hydrocarbon having 3 to 15 carbon atoms, and the preferable branched alkyl group has 2 to 4 of secondary, tertiary or quaternary carbon atoms in all. Typical examples of the branched alkyl group include hydrocarbon groups such as an isopropyl group, sec-butyl group, t-butyl group, neopentyl group, 1,2-dimethylpropyl group, cyclohexyl group, 1,3-dimethylbutyl group, 1-iso-propylpropyl group, 1,2-dimethylbutyl group, 1,4-dimethylpentyl group, 2-methyl1-iso-propylpropyl group, 1-ethyl-3-methylbutyl group, 3-methyl-l-iso-propylbutyl group, 2-methyl-l-iso-propylbutyl group and 1-t-butyl-2-methylpropyl group, and a halogenated alkyl group such as 1,1,1,3,3,3-hexafluoro-2-propyl group.

Examples of a divalent metallic atom represented by Met include Cu, Zn, Mn, Fe, Co, Ni, Ru, Rh, Pd, Pt and Pb, and examples of a trivalent and a tetravalent metal derivative include AlCl, AlBr, AiI, AlOH, INCl, InBr, InI, InOH, SICl$_2$, SiBr$_2$, SiI$_2$, Si(OH)$_2$, GeCl$_2$, GeBr$_2$, GeI$_2$, SnCl$_2$, SnBr$_2$, SnF$_2$ and Sn(OH)$_2$, and examples of an oxy metal include VO and TiO. When Cu, Co, Ni, Rh, Pd or Pt of these metals and their derivatives is the central metal, the phthalocyanine represented by the above-mentioned formula (1) is usually liable to associate, to crystallize and to be insoluble or sparingly soluble in the solvent, so long as any treatment is not given. However, as in the present invention, the phthalocyanine in which the crystal form is amorphous is difficult to associate and excellent in solubility.

A phthalocyanine ring can be synthesized by thermally reacting 1 to 4 kinds of phthalonitriles represented by the following formula (2) or diiminoisoindolines represented by the following formula (3) as starting materials with the above-mentioned metal or a metal or a metallic compound which will be able to become the above-mentioned metal derivative in a solvent, preferably an alcohol in a temperature range of from 10° to 300° C. In the case that the starting material is the phthalonitrile represented by the formula (2), the reaction temperature is preferably in the temperature range of from 80° to 160° C. Furthermore, in the case that the starting material is the diiminoisoindoline represented by the formula (3), the reaction temperature is preferably in the temperature range of from 140° to 200° C. As a catalyst for the ring formation reaction, there may be added an auxiliary such as 1,8-diazabicyclo[5.4.0]-7-undecene (DBU) or 1,5-diazabicyclo[4.3.0]-5-nonene (DBN).

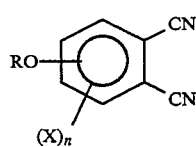
(2)

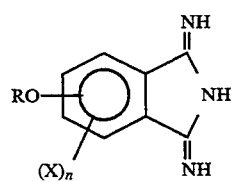
(3)

wherein R is a branched alkyl group, X is a halogen atom, and n is 0, 1, 2 or 3.

The halogenated alkoxyphthalocyanine synthesized under the above-mentioned conditions is represented by the above-mentioned formula (1).

The preferable halogenated alkoxyphthalocyanines can be represented by the following formulae (4) and (7).

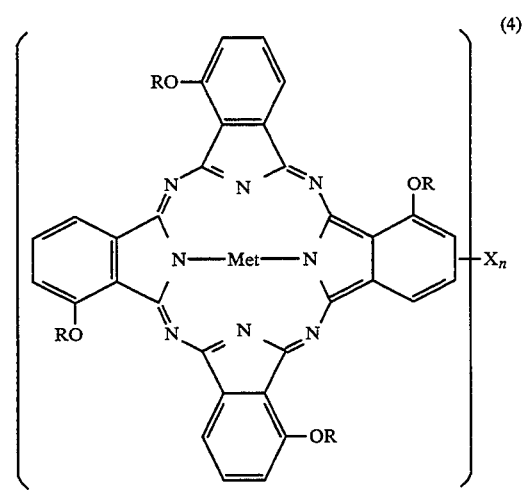
(4)

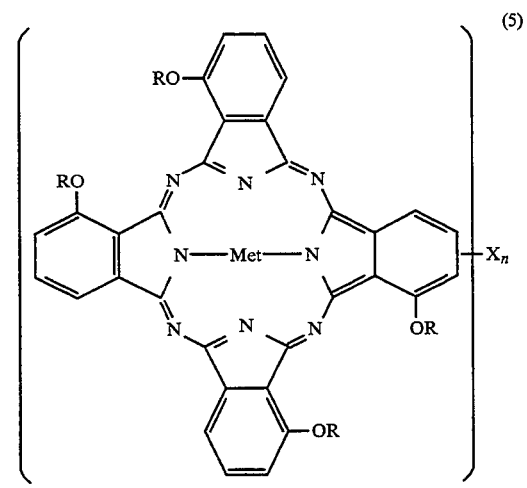
(5)

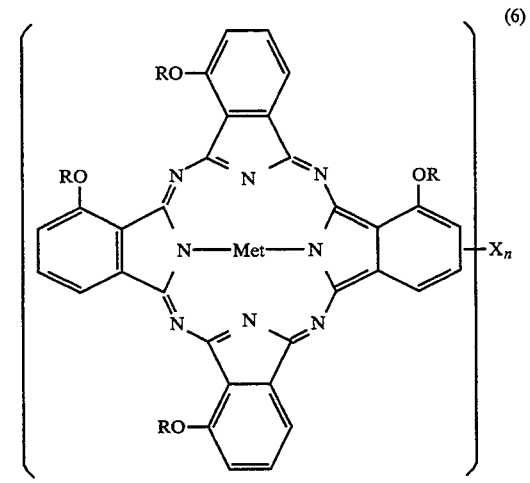
(6)

-continued

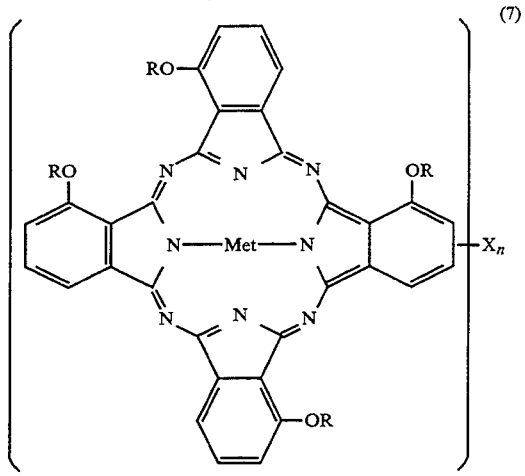

(7)

wherein R, X, n and Met are as defined in the formula (1).

The particularly preferable halogenated alkoxyphthalocyanines can be represented by the following formulae (4) to (7) in which the branched alkyl group represented by R has 2 to 4 of secondary, tertiary or quaternary carbon atoms in all.

The alkoxyphthalonitrile represented by the formula (2) or the alkoxydiiminoisoindoline represented by the formula (3) which is used in the present invention can be synthesized in accordance with the following reaction formula ( 8 ):

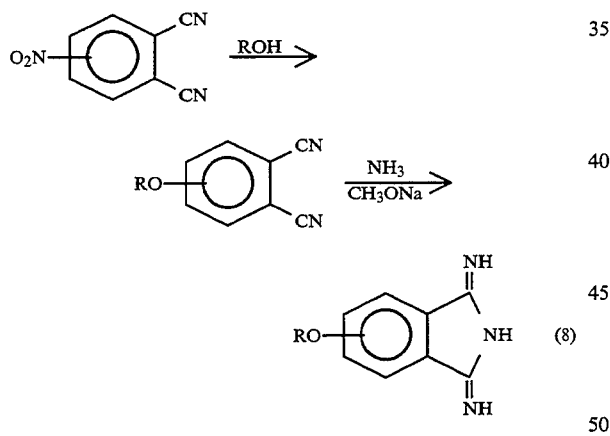

(8)

3-Nitrophthalonitrile or 4-nitrophthalonitrile which was the starting material was available from Tokyo Chemicals Inc. The primary reaction of from nitrophthalonitrile to the alkoxyphthalonitrile was carried out in accordance with a process described in NOUVEAU JOURNAL DE CHIMIE, Vol. 6, No. 12, pp 653–58, 1982. That is, an alcohol was reacted with sodium hydride to form a sodium alkoxide, and the latter compound was successively reacted with nitrophthalonitrile at a temperature of from 0 to 100° C. to obtain the alkoxyphthalonitrile.

The halogenation of the alkoxyphthalonitrile was made by a process described in I. T. Harrison and S. Harrison, "COMPENDIUM OF ORGANIC SYNTHETIC METHOD", Vol. 1 to 6, Wiley-Interscience to synthesize the halogenated phthalonitrile. Afterward, the product was separated/purified by a column chromatography. Preferable examples of a halogenating agent which can be used in the above-mentioned halogenation include chlorine, bromine, iodine, sulfuryl chloride, thionyl chloride, antimony chloride, iodine trichloride, iron (III) chloride, phosphorus pentachloride, phosphoryl chloride, t-butyl hypochlorite, N-chlorosuccinimide, cuprous bromide, quaternary ammonium bromide, N-bromosuccinimide, iodine monochloride, quaternary ammonium iodide and potassium triiodide. The amount of the halogenating agent is suitably in the range of from 1 to 2 molar ratio. A halogenated phthalocyanine mixture which is used in the present invention can be synthesized as follows.

A mixture of isomers represented by the following formulae (9) to (12) is reacted with the halogenating agent at 20°–90° C. in a mixed solvent of the organic solvent and water to synthesize a phthalocyanine mixture of the isomers represented by the formulae (4) to (7).

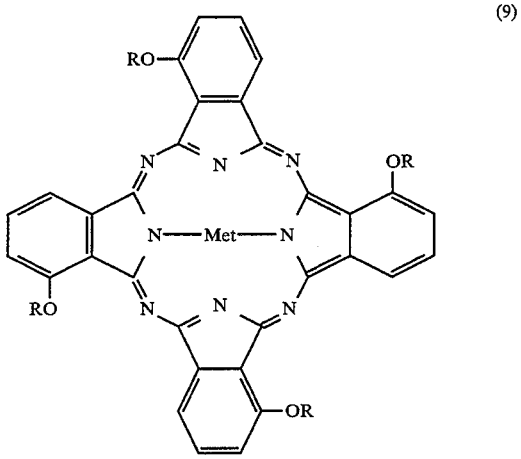

(9)

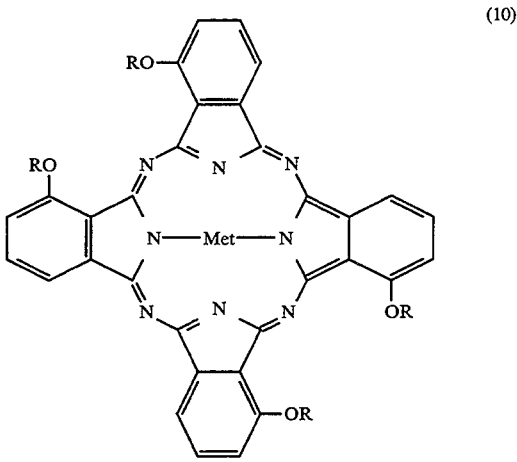

(10)

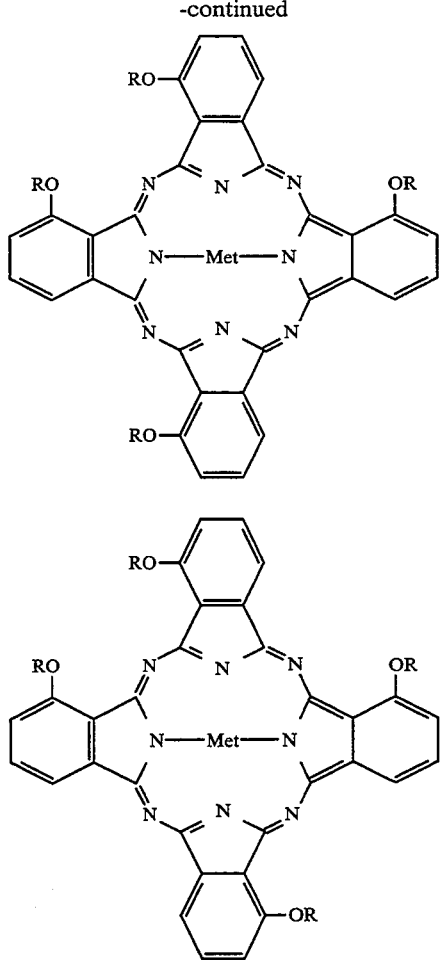

wherein R and Met are as defined in the formulae (4) to (7).

In this case, the following phenomenon can be presumed. When the phthalocyanine compound is reacted with the halogenating agent in the mixed solvent of the organic solvent and water, a hydrogen halide, a salt of the halogenating agent or the like which is a by-product is dissolved in water, so that the phthalocyanine compound is prevented from precipitating together with the by-product in the organic solvent which is a reaction solvent, with the result that the halogenation can be accomplished with a good efficiency.

As the halogenating agent, there can be utilized a compound represented by the formula (13)

$$X-Y \qquad (13)$$

wherein X is a halogen atom, and Y is a residue of the halogenating agent.

Examples of the halogen atom represented by X include F, Cl, Br and I, and Br is preferable. Examples of the residue of the halogenating agent represented by Y include Cl, Br, I, $SO_2Cl$, SOCl, $FeCl_2$, $PCl_2$, $PCl_4$, $POCl_2$, CuBr and quaternary ammonium.

Examples of the halogenating agent include chlorine, bromine, iodine, sulfuryl chloride, thionyl chloride, antimony chloride, iodine trichloride, iron (III) chloride, phosphorus pentachloride, phosphoryl chloride, t-butyl hyprochlorite, N-chlorosuccinimide, cuprous bromide, quaternary ammonium bromide, N-bromosuccinimide, iodine monochloride, quaternary ammonium iodide and potassium triiodide. Bromine is particularly preferable. The amount of the halogenating agent is suitably in the range of from 1 of 16 molar ratio, depending upon the desired amount of the halogen.

A reaction temperature is in the range of from 20 to 90° C., preferably from 40 to 70° C. When the reaction temperature is less than 20° C., the reaction does not proceed successfully, and conversely when it is in excess of 90° C., it is difficult to control a halogenation degree.

The organic solvent is not substantially miscible with water, and in other words, it forms two layers with water. The organic solvent is a solvent in which the phthalocyanine mixture of the isomers having the formulae (9) to (12) can be dissolved, and a preferable example of the organic solvent is one or more selected from the group consisting of saturated hydrocarbons, ethers and halogenated hydrocarbons. A more preferable example thereof is one or more selected from the group consisting of n-hexane, n-pentane, n-octane, cyclohexane, methylcyclohexane, ethylcyclohexane, dimethylcyclohexane, tetrahydrofuran, n-butyl ether, n-propyl ether, isopropyl ether, carbon tetrachloride, chloroform, dichloromethane, 1,1,1-trichloroethane, 1,1,2-trichloroethane and 1,1,2,2-tetrachloroethane.

The amount of the organic solvent is from 2 to 500 times by weight, preferably from 3 to 200 times by weight as much as that of the phthalocyanine mixture which is the raw material. This amount is required to be enough to dissolve the phthalocyanine mixture, but when it is less than 2 times by weight, a solid is apt to precipitate during the reaction and the reaction is impeded. On the other hand, when the amount of the organic solvent is more than 500 times by weight, the reaction is improperly too late. Particularly when 1,1,2-trichloroethane or 1,1,2,2-tetrachloroethane is used, its amount is preferably from 4 to 10 times by weight.

The amount of water is from 0.05 to 10 times by weight, preferably 0.1 to 5 times by weight as much as that of the organic solvent, and such a ratio as to form many interfaces between water and the organic solvent is preferable. When the amount of water is less than 0.05 times by weight, an effect of mixing water is not present, and a solid tends to precipitate during the reaction, so that the reaction is disturbed. On the other hand, when the amount of water is more than 10 times by weight, the amount of the solvent is too much, so that a reaction efficiency improperly deteriorates.

In most cases, the alkoxyphthalocyanine compound or the mixture which has not undergone the treatment of the present invention yet takes a certain crystalline state, so that its solubility in the solvent is low. That is, the alkoxyphthalocyanine compound or the mixture which has not been treated is not dissolved to a predetermined concentration of a coating colution, or even once it is dissolved, it will precipitate in a short period of time. On the contrary, when a heat treatment and freeze-drying are carried out in accordance with the present invention, association is cleaved, so that an amorphous state can be obtained and solubility can be remarkably improved.

Now, the present invention will be described in detail in reference to examples, but the scope of the present invention should not be limited to these examples.

In Examples 1 to 6, 8 to 12, and 14 to 16, X-ray diffraction patterns of phthalocyanine compounds or mixtures before and after treatments are referred to, but conditions of the X-ray diffraction are as follows.

Tubular bulb=Cu, tube voltage=50 kV, tube current=200 mA, goniometer=wide-angle goniometer, sampling angle=0.020°, scanning speed=8.0°/minute, scanning axis=2θ/θ, filter=Ni, dispersion slit=1°, scattering slit=1°, and fluorescent slit=0.15 mm.

EXAMPLE 1

37.56 g (145 mmol) of diiminoisoindoline represented by the formula (14)

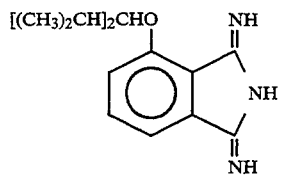
(14)

6.38 g (36 mmol) of palladium chloride, 22.07 g (145 mmol) of DBU and 300 ml of 1-octanol were mixed at room temperature, and the mixture was then heated up to a reflux temperature in 30 minutes. Reaction was carried out for 5 hours under reflux, and the solution was cooled to room temperature and then poured into 1000 ml of methanol. Precipitated crystals were collected by filtration and then washed with 300 ml of methanol, followed by drying at 60° C., to obtain 35.8 g of a mixture of isomers represented by the formulae (15), (16), (17) and (18). Yield was 92%. The mixture had a maximum absorption wave length $\lambda_{max}$ of 692 nm and $\epsilon_{max}$ of $2.7 \times 10^5$/toluene. According to an area ratio on a liquid chromatogram, a production ratio of these isomers was (15)/(16)/(17)/(18)=86/9/3/2.

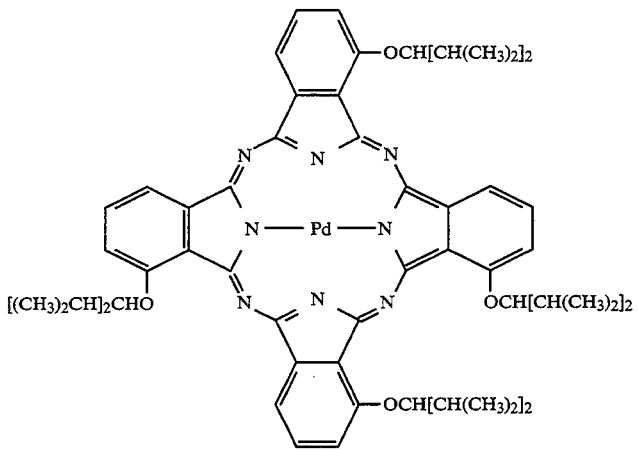
(15)

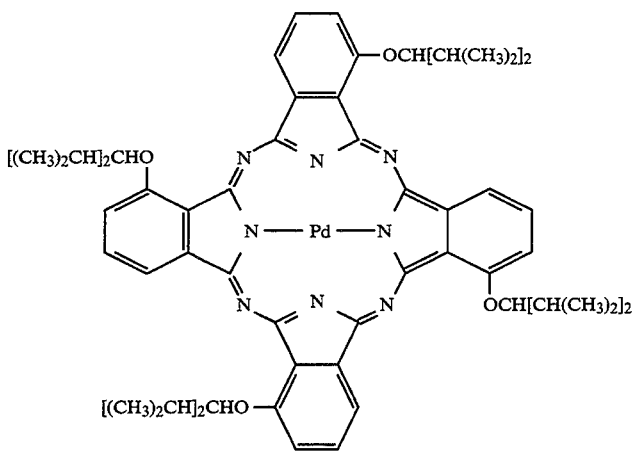
(16)

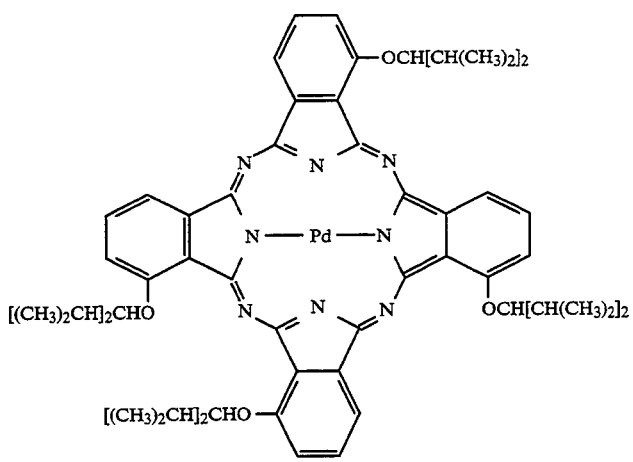

(17)

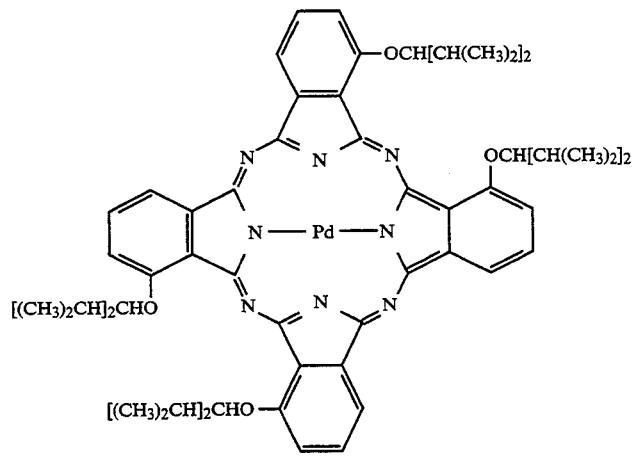

(18)

30 g (27.89 mmol) of the thus obtained phthalocyanine mixture were dissolved in 180 g (125 mmol) of 1,1,2-trichloroethane, and 60 g (60 ml) of water were then added thereto. Next, a mixture of 13.6 g (85.22 mmol) of bromine and 38 g (26 ml) of 1,1,2-trichloroethane was added thereto dropwise at 50°–55° C., and reaction was then carried out at 55°–60° C. for 1 hour. Afterward, 30 g of a 15% aqueous sodium hydrogensulfite solution were added to carry out washing. The resultant organic layer was added dropwise to 480 g of methanol, and precipitated crystals were collected by filtration to obtain 35.9 g of a brominated phthalocyanine mixture of isomers represented by the following formulae (19), (20), (21) and (22):

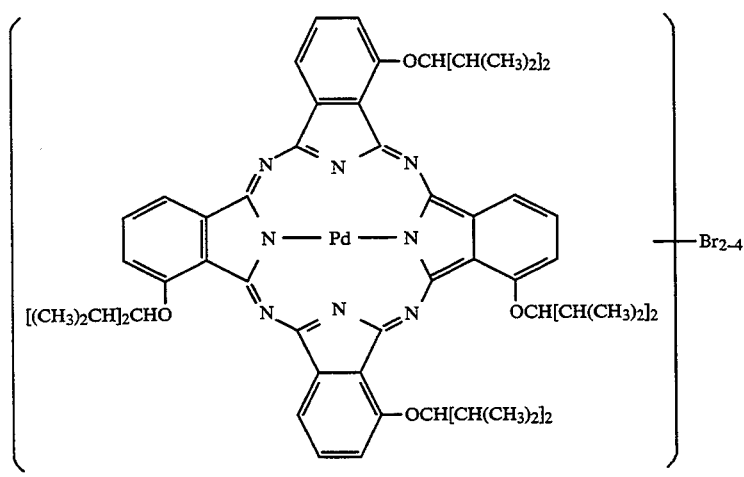

(19)

(20)

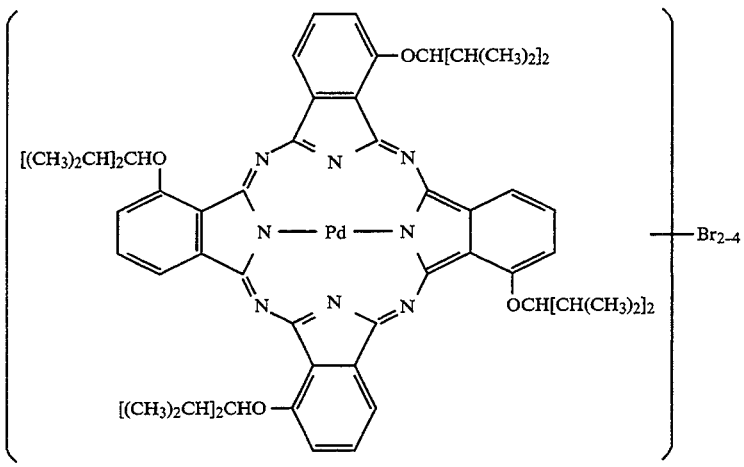

(21)

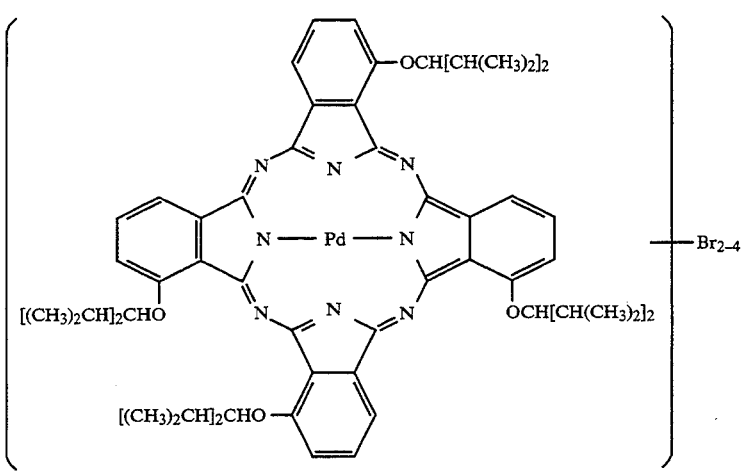

(22)

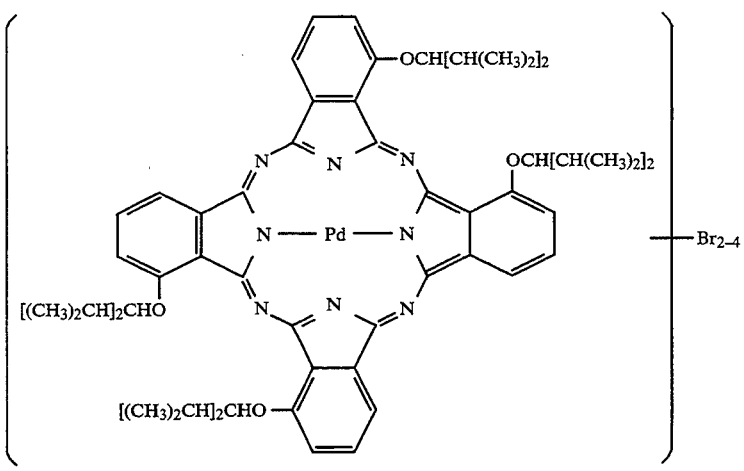

The mixture had a maximum absorption wave length $\lambda_{max}$ of 711 nm, $\epsilon_{max}$ of $1.6 \times 10^5 g^{-1} cm^2$ and a melting point of 215°–45° C.

Figure 2:
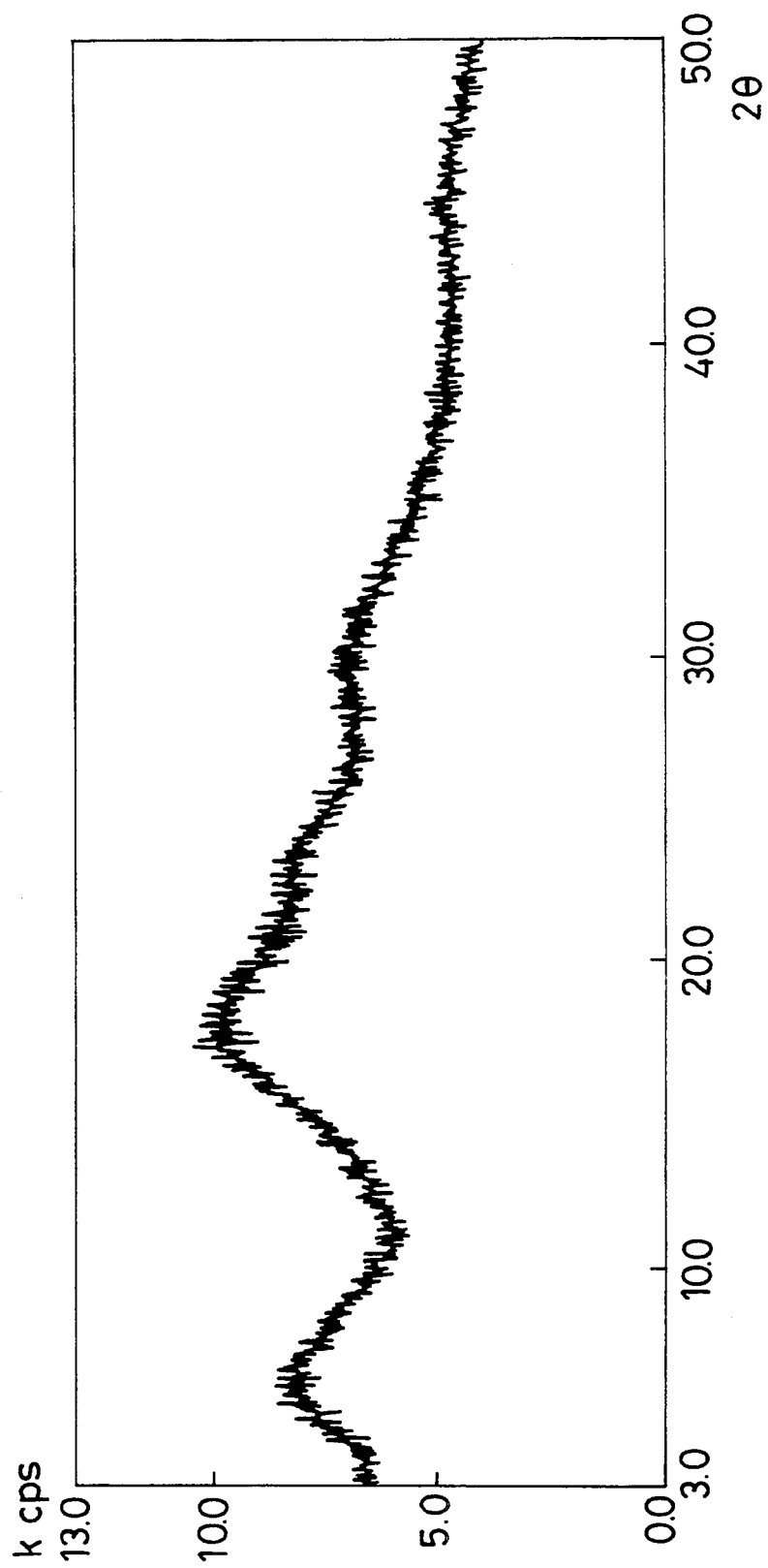
FIG. 2 is an X-ray diffraction pattern of a treated phthalocyanine in Example 1.

35 g of the above-mentioned mixture (X-ray diffraction pattern, FIG. 1) were dissolved in 1 liter of p-xylene, and the solution was then stirred at 80° C. for 2 hours. After cooled to room temperature, the solution was placed in a Triomaster A type freeze-dryer made by Kyowa Vacuum Co., Ltd. and then cooled to −40° C. to freeze the solution, and a heating medium for heating shelves in the freeze-dryer was heated up to 30° C. under reduced pressure (300 mTorr). Freezed p-xylene gradually sublimated, and the temperature of the freezed material rose up to 25° C. and settled at 25° C. (at this time, pressure was 200 mTorr). The pressure in the dryer was returned to atmospheric pressure to obtain a p-xylene-free phthalocyanine. This phthalocyanine was dissolved in ethylcyclohexane at a concentration of 30 g/l and did not precipitate even after 10 hours. An X-ray diffraction pattern of the treated phthalocyanine is shown in FIG. 2. In this diffraction pattern, a peak was broader than in that of the untreated phthalocyanine, by which it was confirmed that the product was amorphous. In this connection, the untreated phthalocyanine mixture was not dissolved in ethylcyclohexane to a concentration of 30 g/l.

EXAMPLE 2

25.6 g (100 mmol) of phthalonitrile represented by the formula (23)

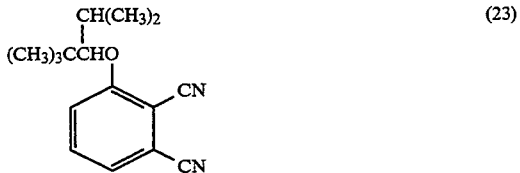
(23)

15.2 g (100 mmol) of DBU and 120 g of 1-hexanol were mixed at room temperature, and the mixture was then heated up to 110° C. Next, 5.3 g (30 mmol) of palladium chloride were added thereto at the same temperature, and reaction was carried out at 110°–120° C. for 12 hours. After the solution was cooled to room temperature, insolubles were removed by filtration and the resultant liltrate was then concentrated. Afterward, 400 ml of methanol were added thereto, and precipitated crystals were collected by filtration and then washed with 100 ml of methanol, followed by drying at 60° C., to obtain 25.9 g of a mixture of isomers represented by the formulae (24), (25), (26) and (27). Yield was 92%. The mixture had a maximum absorption wave length $\lambda_{max}$ of 694 nm and $\epsilon_{max}$ of $2.2 \times 10^5 g^{-1} cm^2$ (toluene). According to an area ratio on a liquid chromatogram, a production ratio of these isomers was (24)/(25)/(26)/(27)=48/49/2/1.

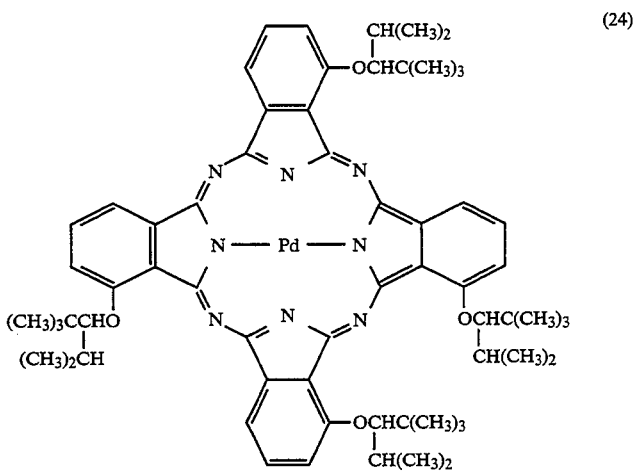
(24)

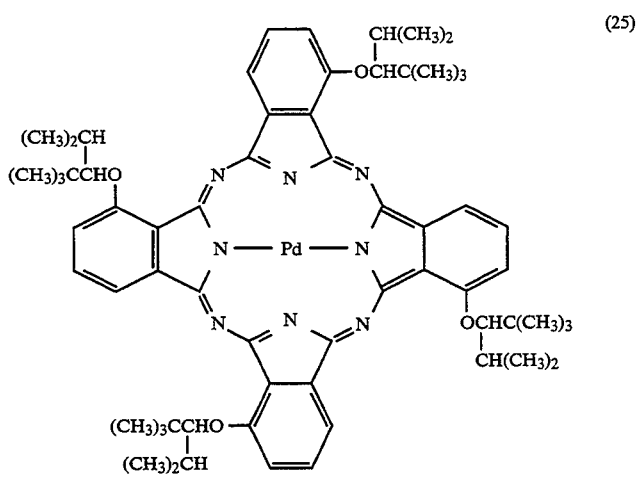
(25)

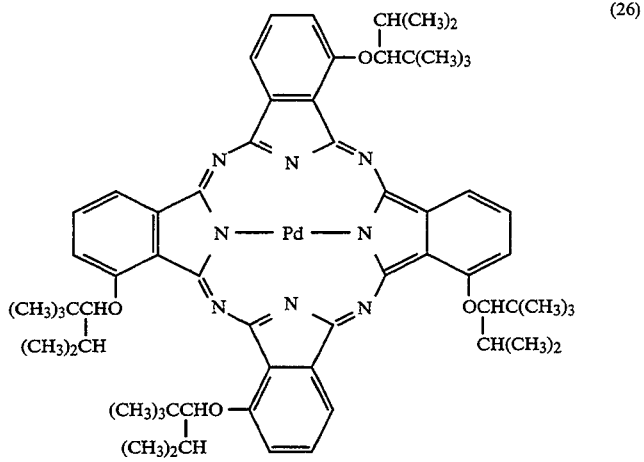

(26)

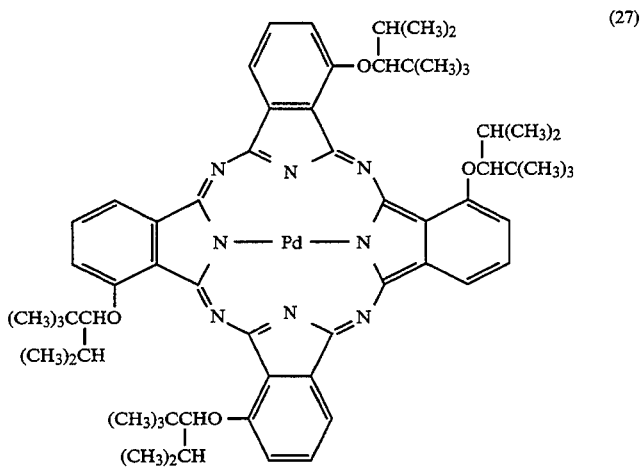

(27)

10 g (8.84 mmol) of the thus obtained phthalocyanine mixture were dissolved in 56 g (39 mmol) of 1,1,2-trichloroethane, and 20 g (20 ml) of water were then added thereto. Next, a mixture of 4.94 g (30.91 mmol) of bromine and 12 g (8 ml) of 1,1,2-trichloroethane was added thereto dropwise at 50°–55° C., and reaction was then carried out at 55°–60° C. for 1 hour. Afterward, 20 g of a 10% aqueous sodium hydrogensulfite solution were added to carry out washing. The resultant organic layer was added dropwise to 135 g of methanol, and precipitated crystals were collected by filtration to obtain 12 g of a brominated phthalocyanine mixture of isomers represented by the following formulae (28), (29), (30) and (31):

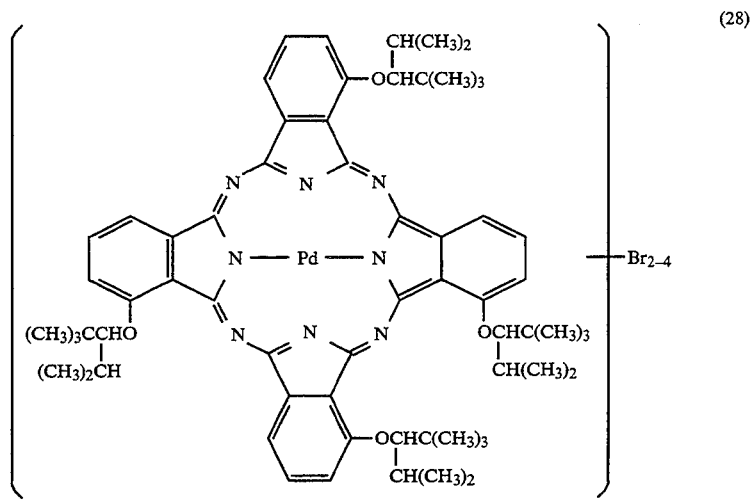

(28)

-continued

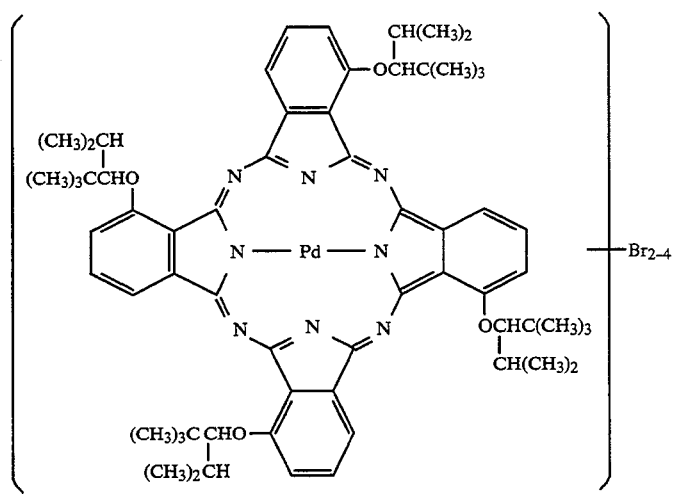

(29)

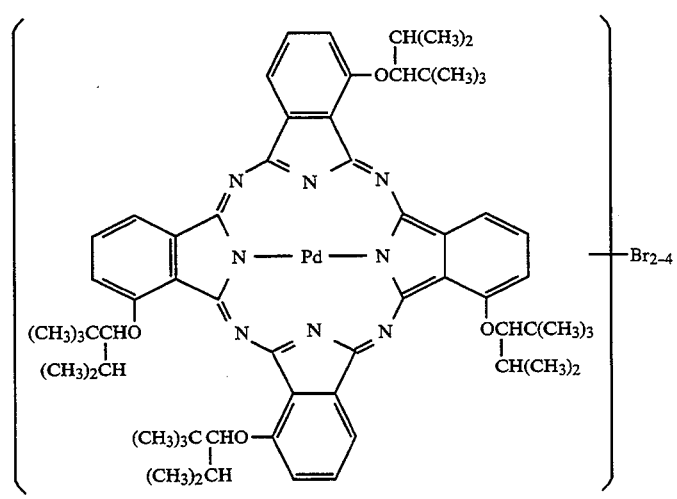

(30)

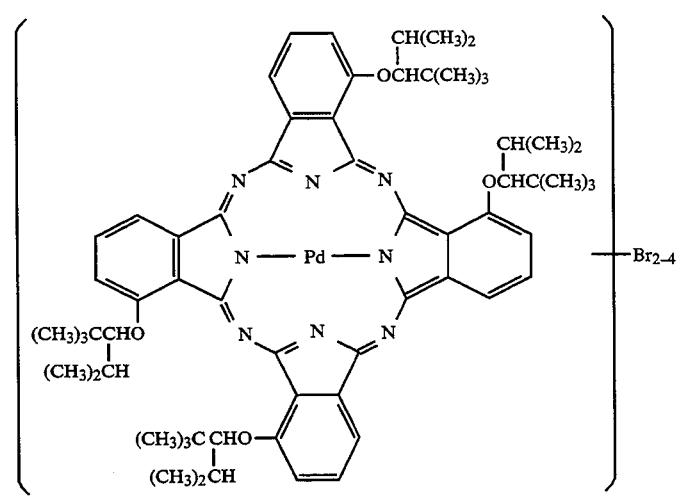

(31)

The mixture had a maximum absorption wave length $\lambda_{max}$ of 705 nm, $\epsilon_{max}$ of $1.7 \times 10^5 g^{31}$ $1 cm^2$ and a melting point of 268°–86° C.

Figure 3:
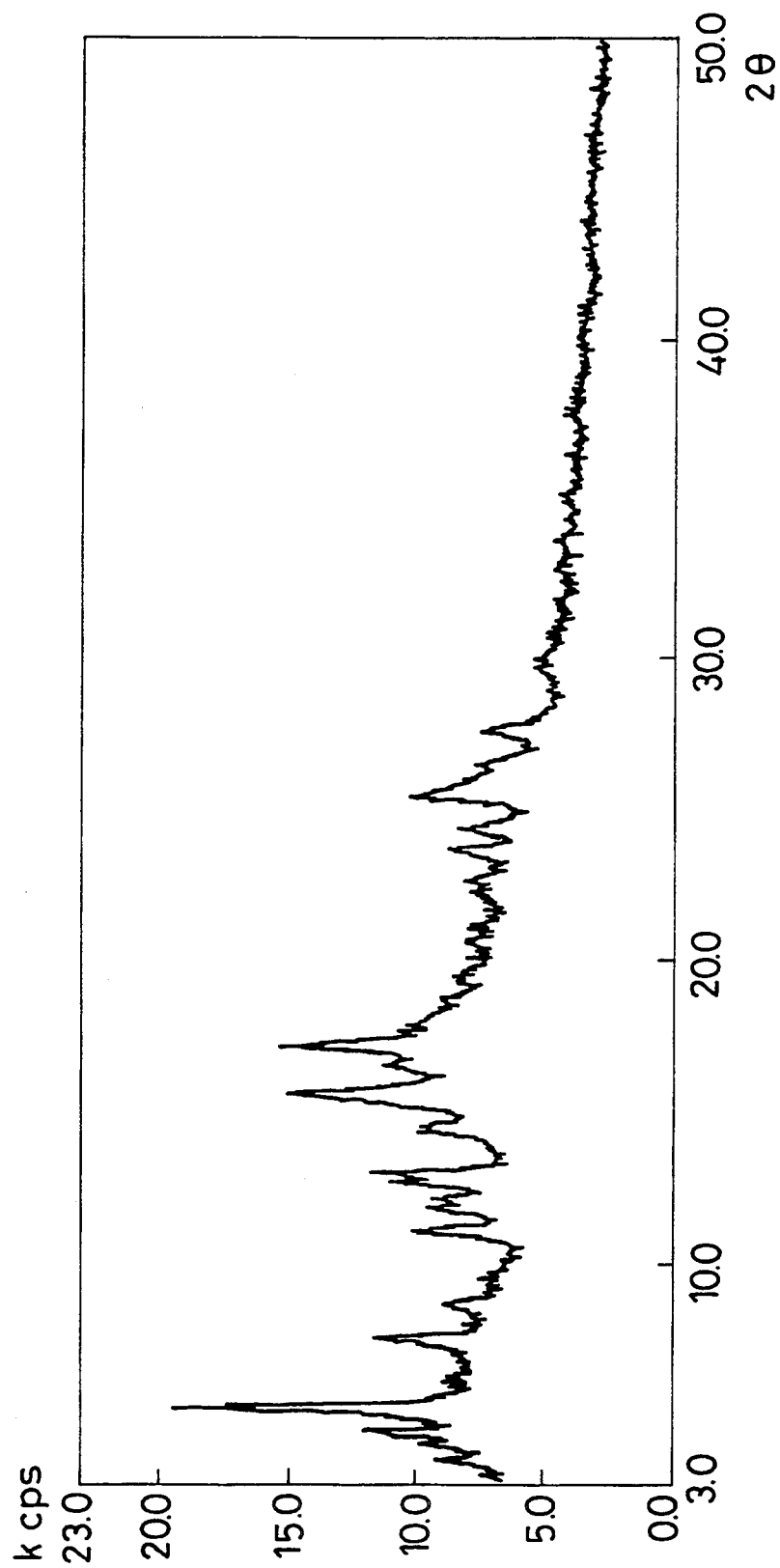
FIG. 3 is an X-ray diffraction pattern of an untreated phthalocyanine in Example 2.
Figure 4:
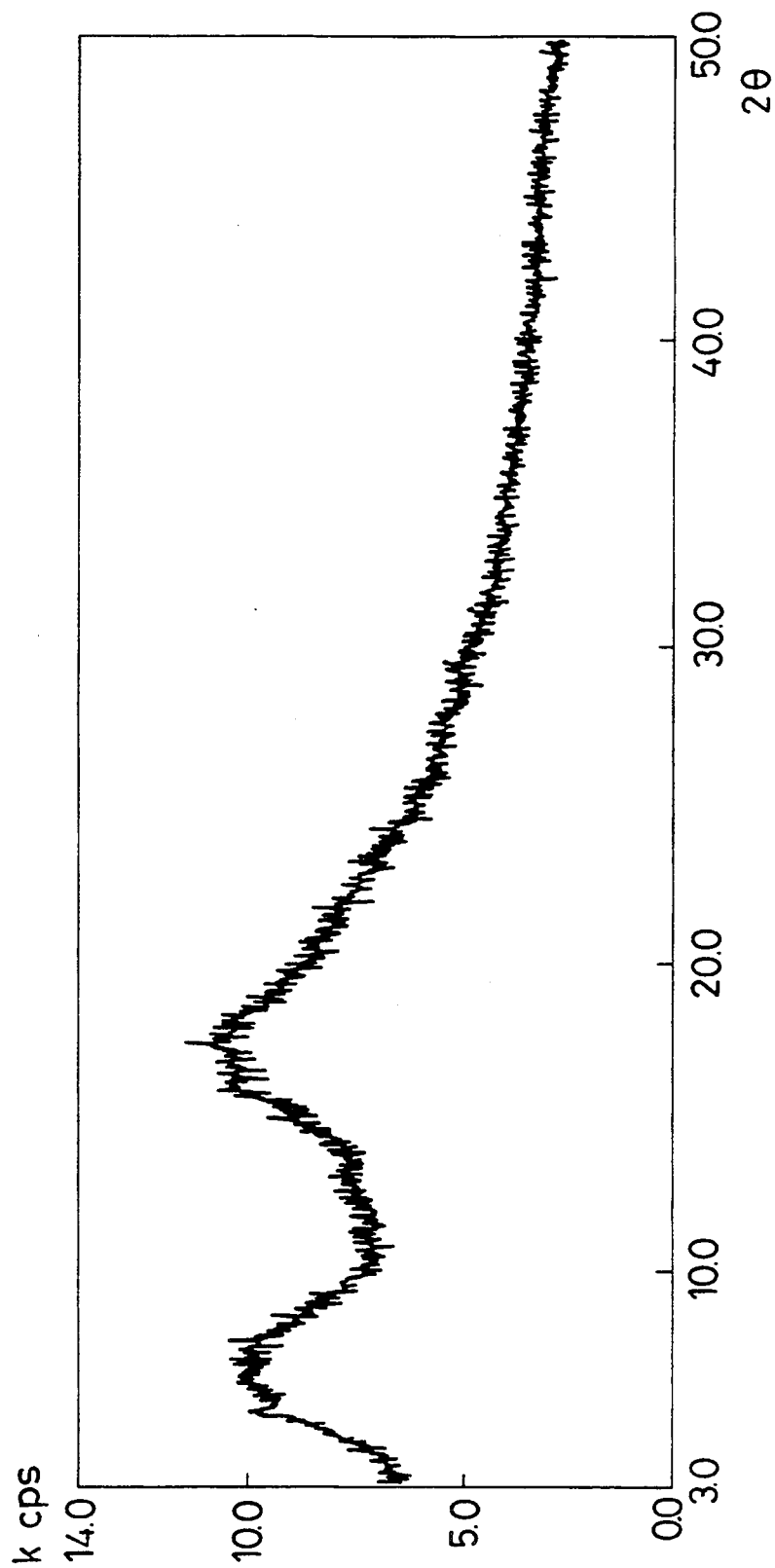
FIG. 4 is an X-ray diffraction pattern of a treated phthalocyanine in Example 2.

10 g of the above-mentioned mixture (X-ray diffraction pattern, FIG. 3) were dissolved in 240 ml of p-xylene, and the solution was then stirred at 100° C. for 2 hours. After cooled to room temperature, the solution was placed in the same freeze-dryer as in Example 1 and then cooled to −30° C. to freeze the solution, and a heating medium for heating shelves in the freeze-dryer was heated up to 30° C. under reduced pressure (250 mTorr). Freezed p-xylene gradually sublimated, and the temperature of the freezed material rose up to 25° C. and settled at 25° C. (at this time, pressure was 150 mTorr). The pressure in the dryer was returned to atmospheric pressure to obtain a p-xylene-free phthalocyanine. This phthalocyanine was dissolved in octane at a concentration of 30 g/l and did not precipitate even after 24 hours. An X-ray diffraction pattern of the treated phthalocyanine is shown in FIG. 4. In this diffraction pattern, a peak was broader than in that of the untreated phthalocyanine, by which it was confirmed that the product was amorphous, In this connection, the untreated phthalocyanine mixture was dissolved in octane at a concentration of 30 g/l, but precipitation took place in 8 hours.

EXAMPLE 3

24.2 g (100 mmol) of phthalonitrile represented by the formula (32)

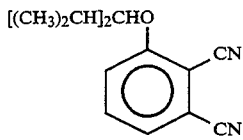
(32)

15.2 g (100 mmol) of DBU and 100 g of n-amyl alcohol were mixed at room temperature, and the mixture was then heated up to 90° C. Next, 5.3 g ( 30 mmol) of palladium chloride were added thereto at the same temperature, and reaction was carried out at 90°-100° C. for 12 hours. After the solution was cooled to room temperature, insolubles were removed by filtration and the resultant filtrate was then concentrated. Afterward, 400 ml of methanol were added thereto, and precipitated crystals were collected by filtration and then washed with 100 ml of methanol, followed by drying at 60° C., to obtain 24.6 g of a mixture of isomers represented by the formulae (15), (16), (17) and (18). Yield was 92%. The mixture had a maximum absorption wave length $\lambda_{max}$ of 690 nm and $\epsilon_{max}$ of $2.8 \times 10^5 g^{31}$ $^1cm2$ (toluene). According to an area ratio on a liquid chromatogram, a production ratio of these isomers was (15)/(16)/(17)/(18)=48/48/2/2.

Figure 5:
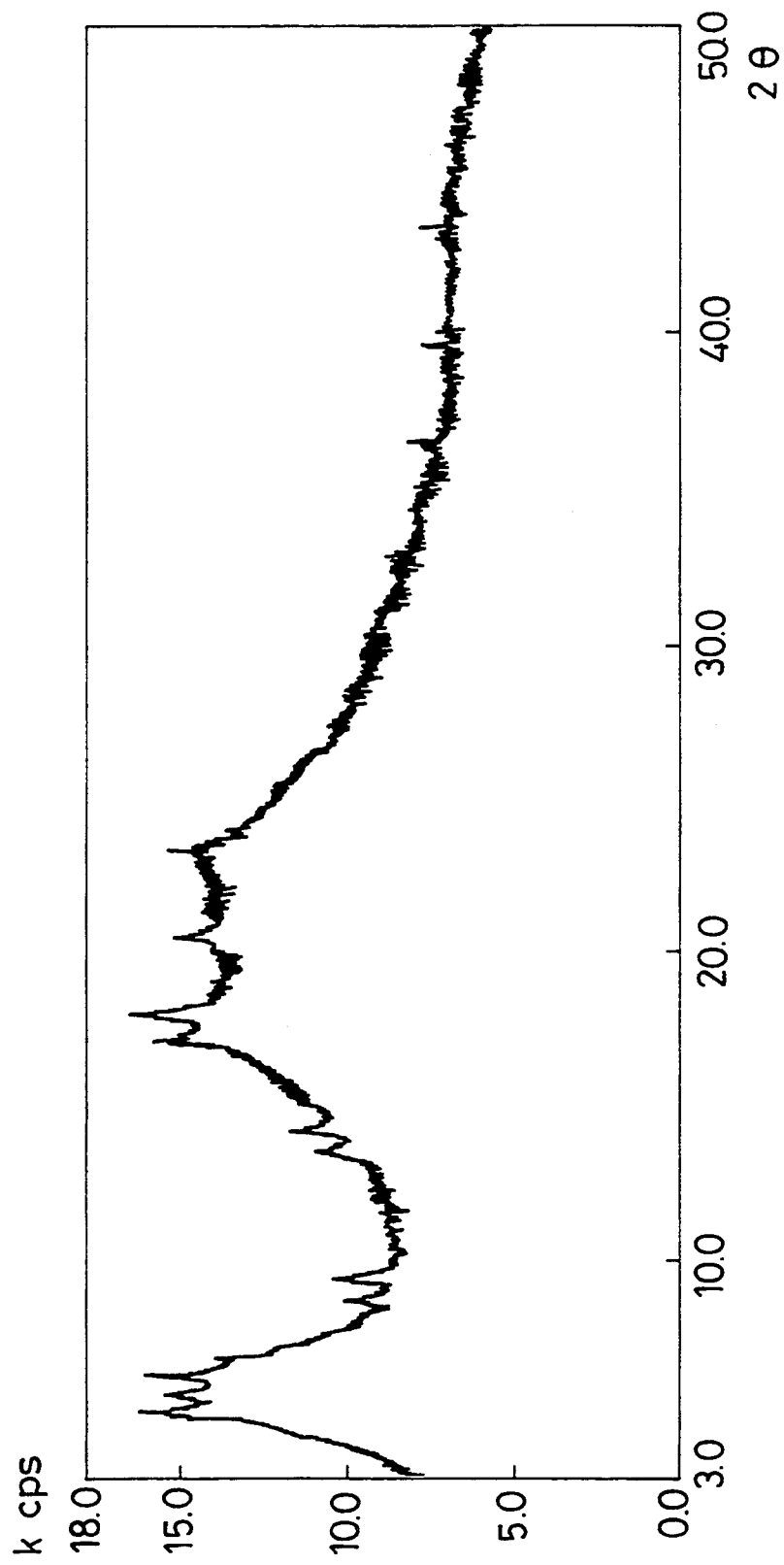
FIG. 5 is an X-ray diffraction pattern of an untreated phthalocyanine in Example 3.
Figure 6:
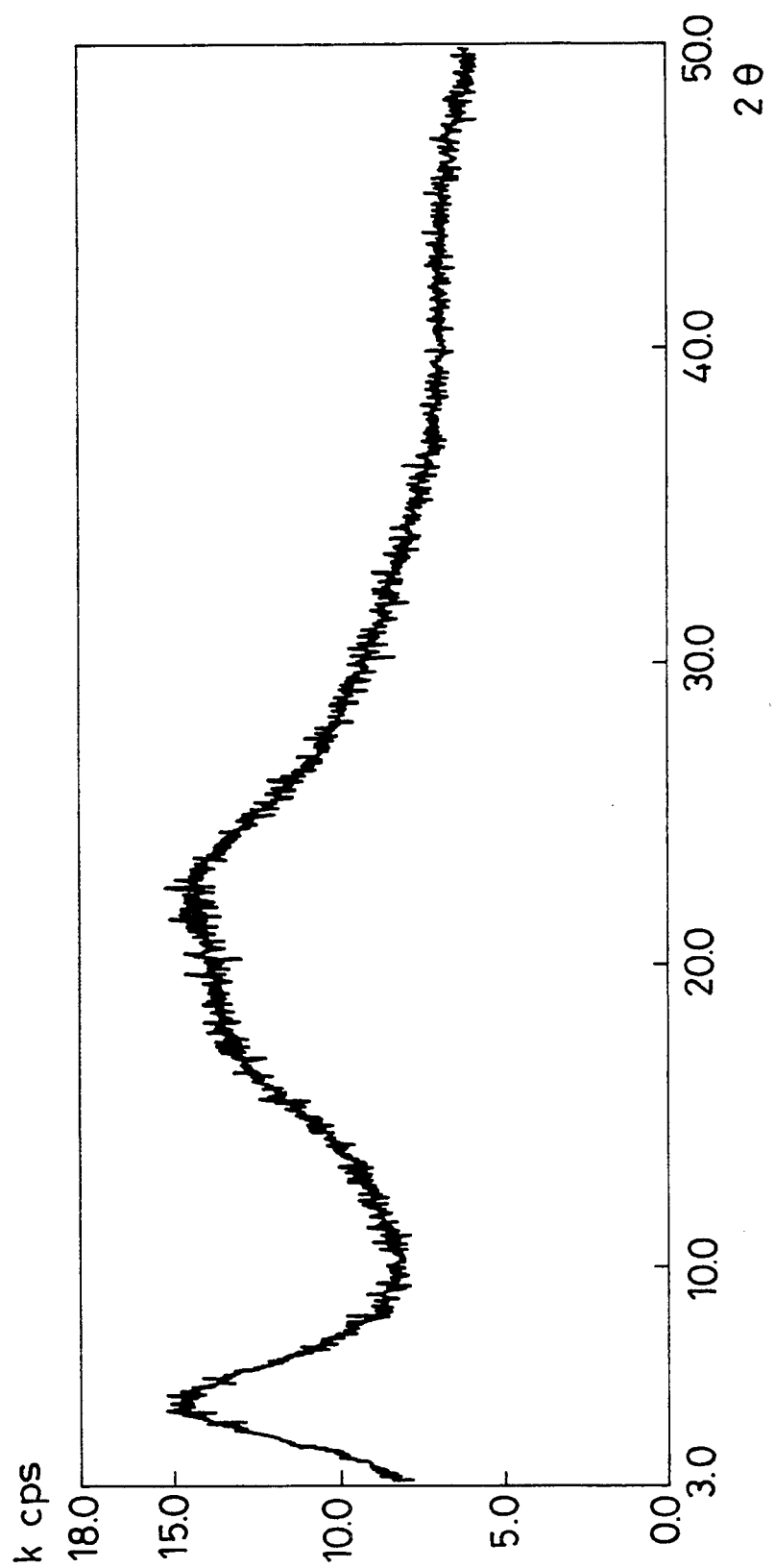
FIG. 6 is an X-ray diffraction pattern of a treated phthalocyanine in Example 3.

20 g of the above-mentioned mixture (X-ray diffraction pattern, FIG. 5) were dissolved in 400 ml of benzene, and the solution was then stirred at 80° C. for 3 hours. After cooled to room temperature, the solution was placed in the same freeze-dryer as in Example 1 and then cooled to −40° C. to freeze the solution, and a heating medium for heating shelves in the freeze-dryer was heated up to 30° C. under reduced pressure (280 mTorr). Freezed benzene gradually sublimated, and the temperature of the freezed material rose up to 25° C. and settled at 25° C. (at this time, pressure was 140 mTorr). The pressure in the dryer was returned to atmospheric pressure to obtain a benzene-free phthalocyanine. This phthalocyanine was dissolved in ethylcyclohexane at a concentration of 30 g/l, and the formation of a precipitation was not observed even after 48 hours. An X-ray diffraction pattern of the treated phthalocyanine is shown in FIG. 6. In this diffraction pattern, a peak was broader than in that of the untreated phthalocyanine, by which it was confirmed that the product was amorphous. In this connection, the untreated phthalocyanine mixture was dissolved in ethylcyclohexane at a concentration of 30 g/l, but precipitation took place in 6 hours.

EXAMPLE 4

9.83 g (36 mmol) of diiminoisoindoline represented by the formula (33)

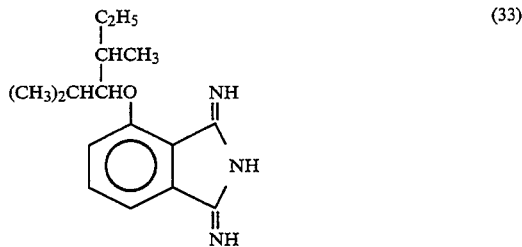
(33)

1.59 g (9 mmol) of palladium chloride, 5.47 g (36 mmol) of DBU and 50 ml of n-octyl alcohol were mixed at room temperature, and reaction was then carried out for 5 hours under reflux. After cooled to room temperature, the solution was poured into 200 ml of methanol. Precipitated crystals were collected by filtration and then washed with 100 ml of methanol, followed by drying at 60° C., to obtain 12.0 g of a mixture of isomers represented by the formulae (34), (35), (36) and (37). Yield was 92%. The mixture had a maximum absorption wave length $\lambda_{max}$ of 692 nm and $\epsilon_{max}$ of $2.5 \times 10^5 g^{31}$ $1cm^2$ (toluene). According to an area ratio on a liquid chromatogram, a production ratio of these isomers was (34)/(35)/(36)/(37)=90/5/3/2.

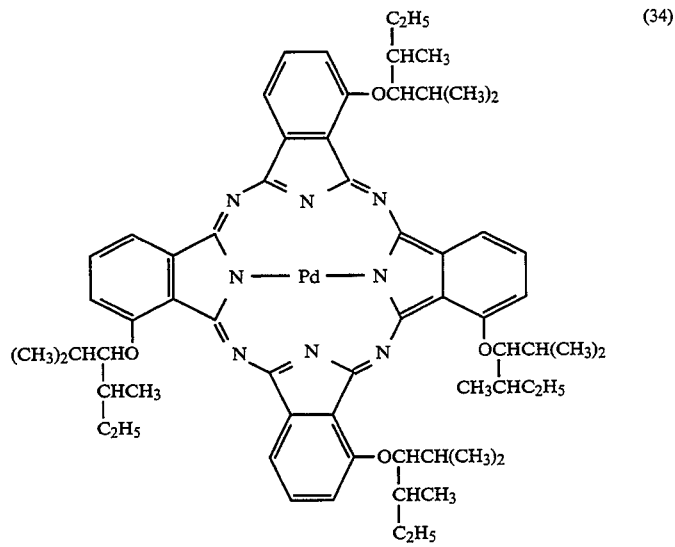
(34)
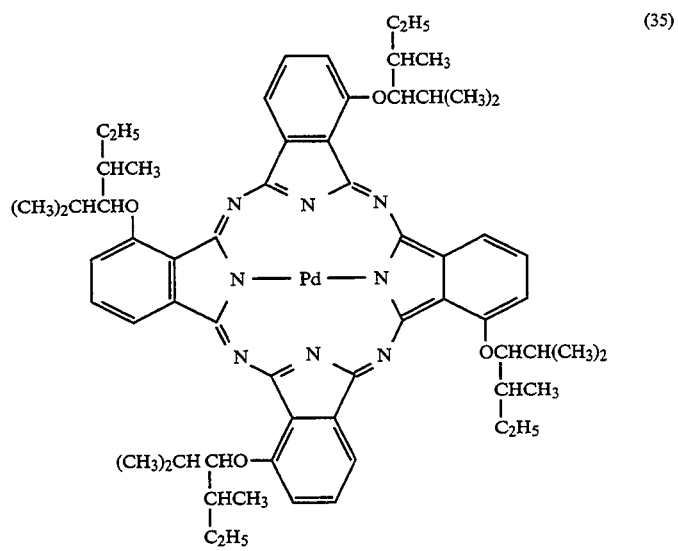
(35)
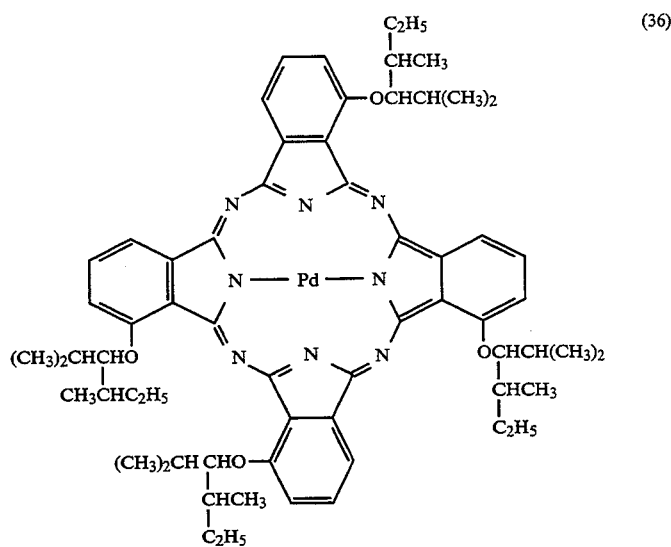
(36)

-continued

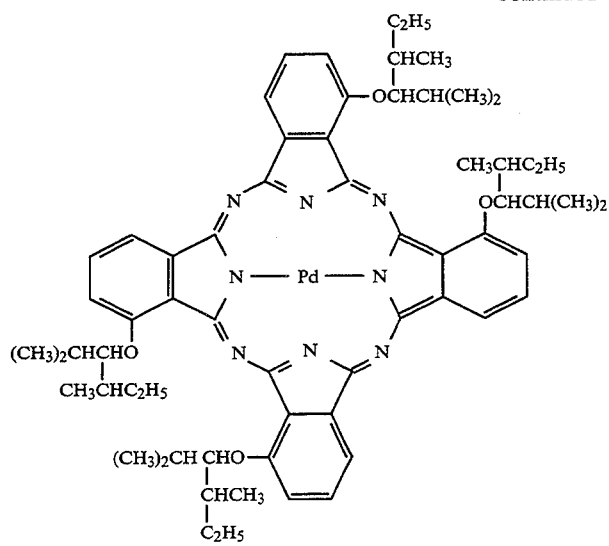
(37)

10 g (8.84 mmol) of the thus obtained phthalocyanine mixture were dissolved in 48 g (30 mmol) of 1,1,2-tetrachloroethane, and 20 g (20 ml) of water were then added thereto. Next, a mixture of 5.51 g (34.48 mmol) of bromine and 16 g (10 ml) of 1,1,2,2-tetrachloroethane was added thereto dropwise at 50°–55° C., and reaction was then carried out at 55°–60° C. for 1 hour. Afterward, 25 g of a 10% aqueous sodium hydrogensulfite solution were added to carry out washing. The resultant organic layer was added dropwise to 158 g of methanol, and precipitated crystals were collected by filtration to obtain 12.5 g of a brominated phthalocyanine mixture of isomers represented by the following formulae (38), (39), (40) and (41):

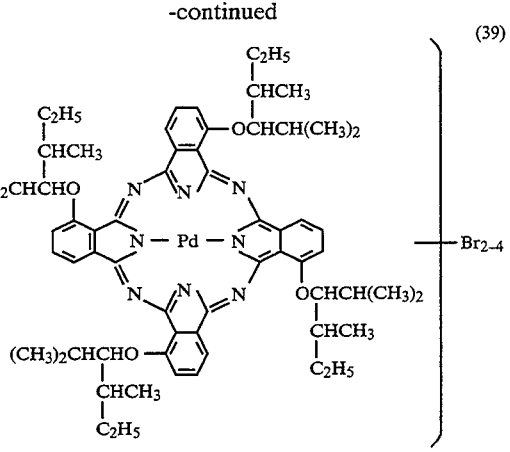
(39)

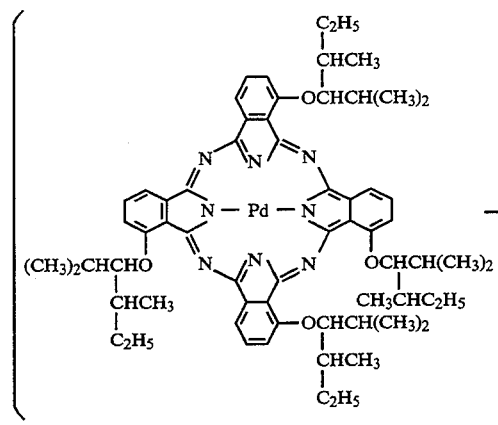
(38)

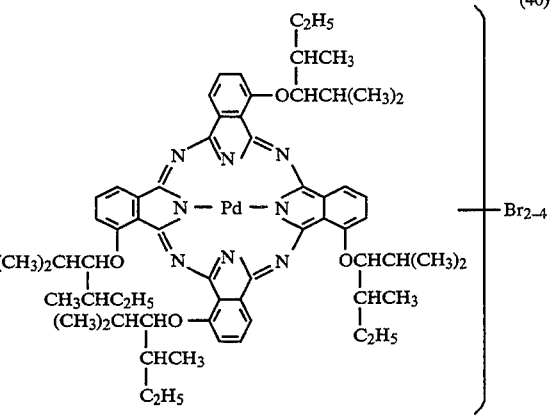
(40)

-continued

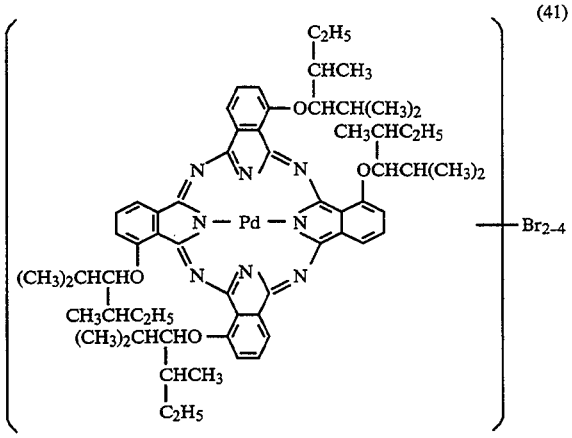

(41)

The mixture had a maximum absorption wave length $\lambda_{max}$ of 709 nm, $\epsilon_{max}$ of $1.4 \times 10^5 g^{-1} cm^2$ and a melting point of 201°–28° C.

Figure 7:
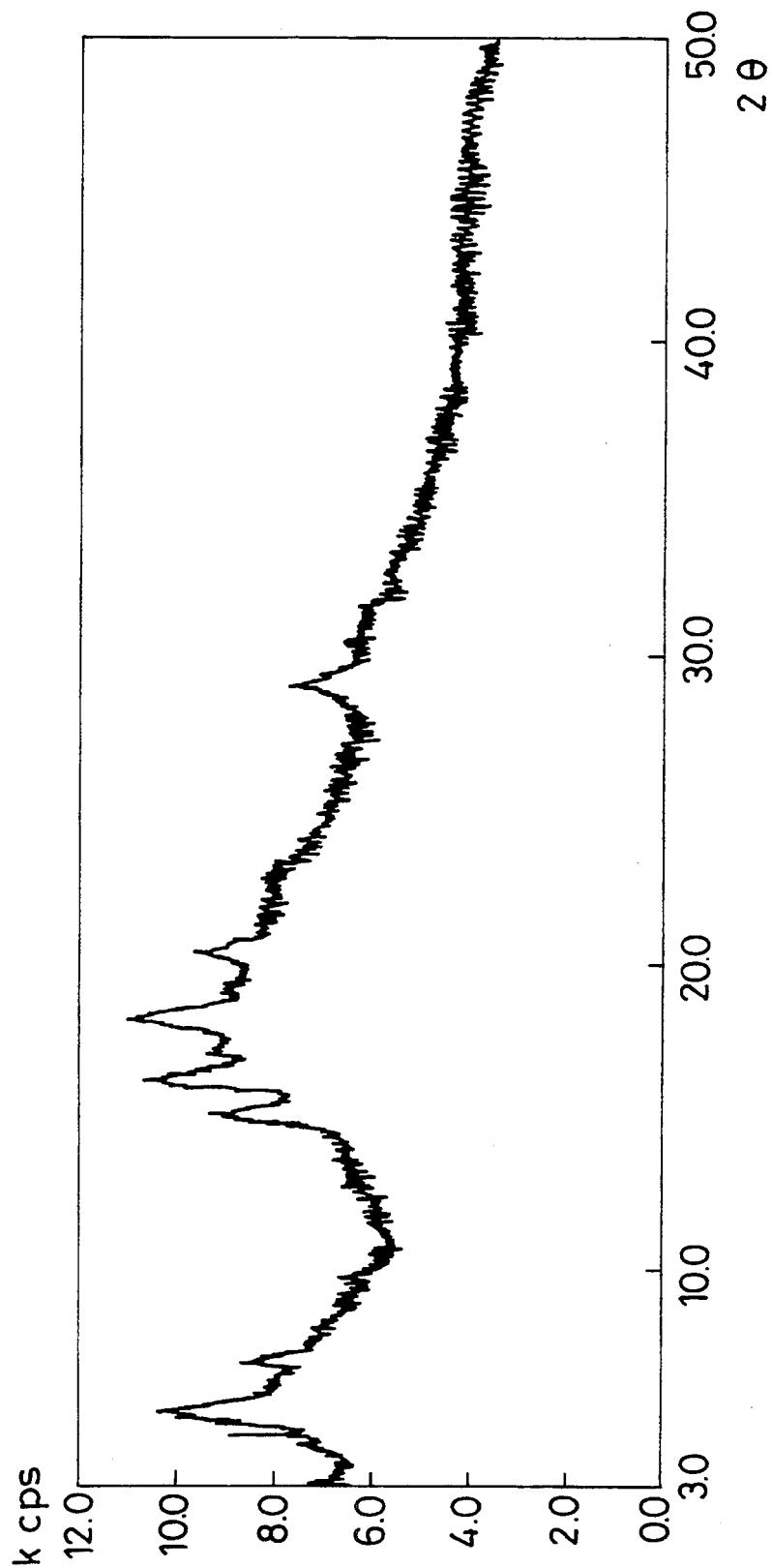
FIG. 7 is an X-ray diffraction pattern of an untreated phthalocyanine in Example 4.
Figure 8:
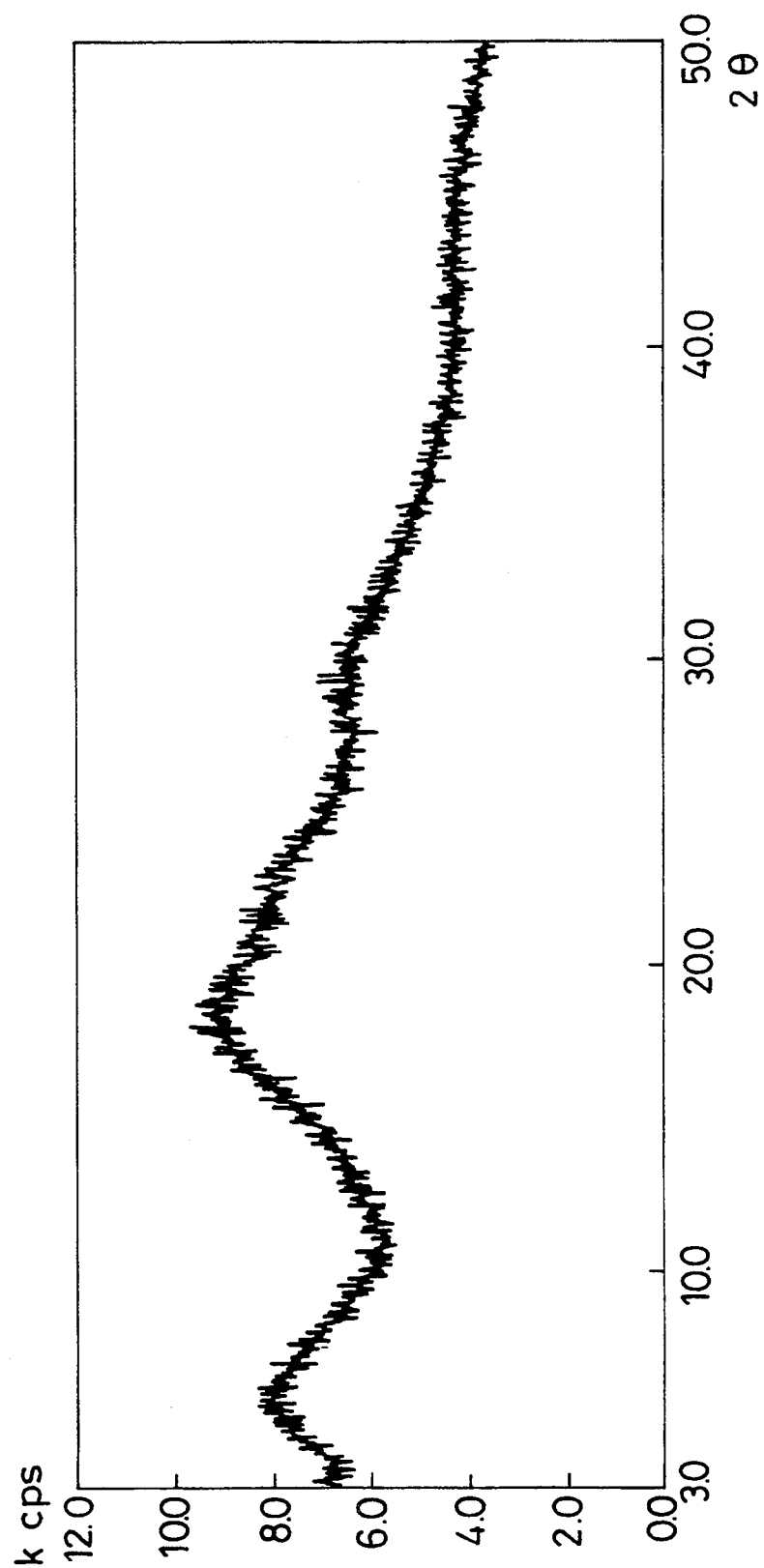
FIG. 8 is an X-ray diffraction pattern of a treated phthalocyanine in Example 4.

10 g of the above-mentioned mixture (X-ray diffraction pattern, FIG. 7) were dissolved in 100 ml of p-xylene, and the solution was then stirred at 100° C. for 2 hours. After cooled to room temperature, the solution was placed in the same freeze-dryer as in Example 1 and then cooled to −40° C. to freeze the solution, and a heating medium for heating shelves in the freeze-dryer was heated up to 40° C. under reduced pressure (250 mTorr). Freezed p-xylene gradually sublimated, and the temperature of the freezed material rose up to 35° C. and settled at 35° C. (at this time, pressure was 150 mTorr). The pressure in the dryer was returned to atmospheric pressure to obtain a p-xylene-free phthalocyanine. This phthalocyanine was dissolved in ethylcyclohexane at a concentration of 30 g/l and did not precipitate even after 48 hours. An X-ray diffraction pattern of the treated phthalocyanine is shown in FIG. 8. In this diffraction pattern, a peak was broader than in that of the untreated phthalocyanine, by which it was confirmed that the product was amorphous. In this connection, the untreated phthalocyanine mixture was dissolved in ethylcyclohexane at a concentration of 30 g/l, but precipitation took place in 8 hours.

EXAMPLE 5

24.2 g (100 mmol) of phthalonitrile represented by the above-mentioned formula (32), 15.2 g (100 mmol) of DBU and 130 g of n-amyl alcohol were mixed at room temperature, and the solution was heated up to 95° C. Next, 2.5 g (25 mmol) of copper (I) chloride were added thereto at the same temperature, and reaction was then carried out at 95°–105° C. for 10 hours. After the solution was cooled to room temperature, insolubles were removed by filtration and the resultant filtrate was then concentrated under reduced pressure. Afterward, 500 ml of methanol were added thereto, and precipitated crystals were collected by filtration and then washed with 100 ml of methanol, followed by drying at 60° C., to obtain 24.0 g of a mixture of isomers represented by the formulae (42), (43), (44) and (45). Yield was 93%. The mixture had a maximum absorption wave length $\lambda_{max}$ of 708 nm and $\epsilon_{max}$ of $2.8 \times 10^5 g^{-1} cm^2$ (toluene). According to an area ratio on a liquid chromatogram, a production ratio of these isomers was (42)/(43)/(44)/(45)=46/47/4/3.

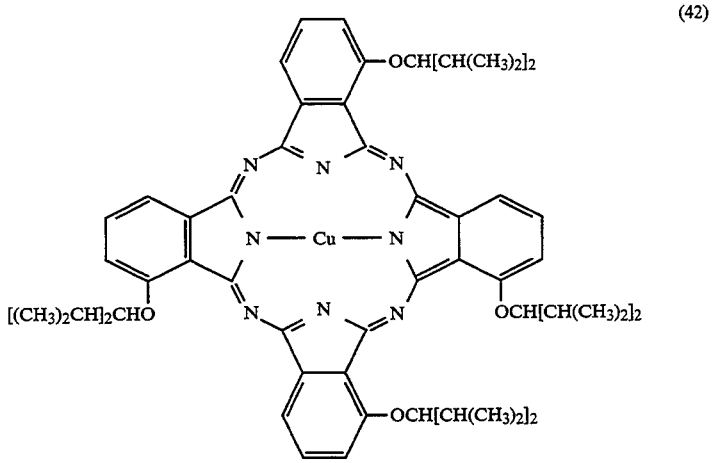

(42)

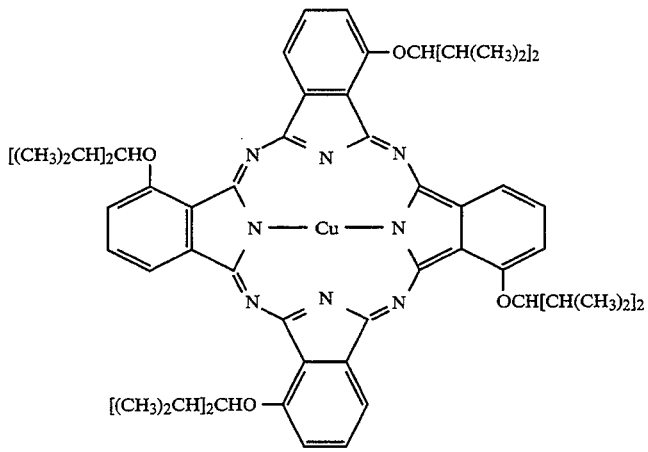

(43)

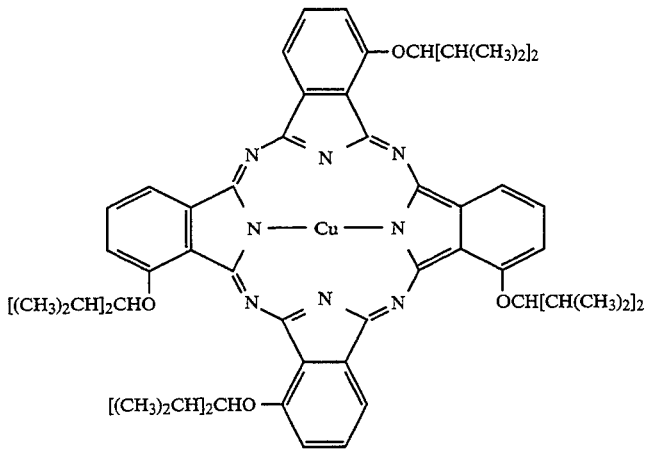

(44)

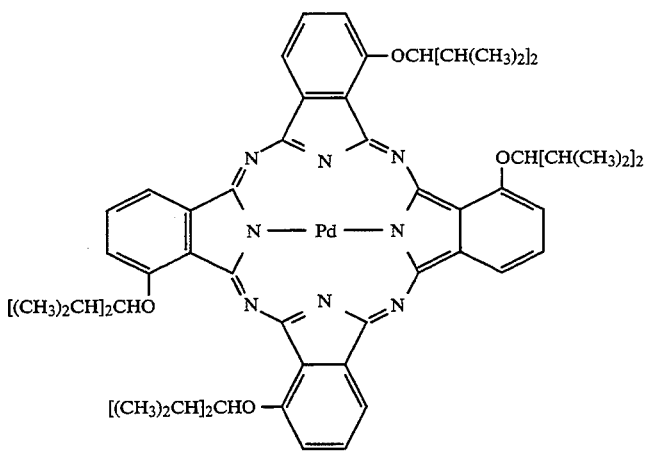

(45)

20 g (18.59 mmol) of the thus obtained phthalocyanine mixture were dissolved in 120 g (83 mmol) of 1,1,2-trichloroethane, and 40 g (40 ml) of water were then added thereto. Next, a mixture of 9.1 g (56.81 mmol) of bromine and 25 g (18 ml), of 1,1,2-tricholorethane was added thereto dropwise at 50°–55° C., and reaction was then carried out at 55°–60° C. for 1 hour. Afterward, 20 g of a 15% aqueous sodium hydrogensulfite solution were added to carry out washing. The resultant organic layer was added dropwise to 320 g of methanol, and precipitated crystals were collected by filtration to obtain 23.9 g of a braminated phthalocyanine mixture represented by the following formulae (46), (47), (48) and (49):

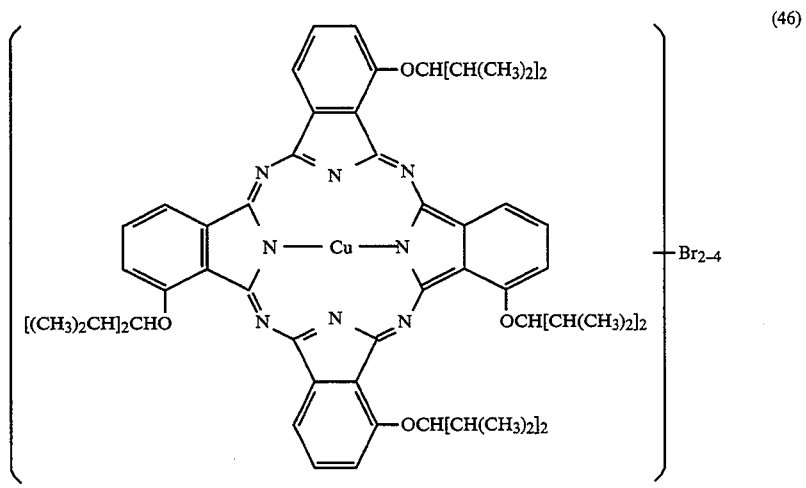
(46)
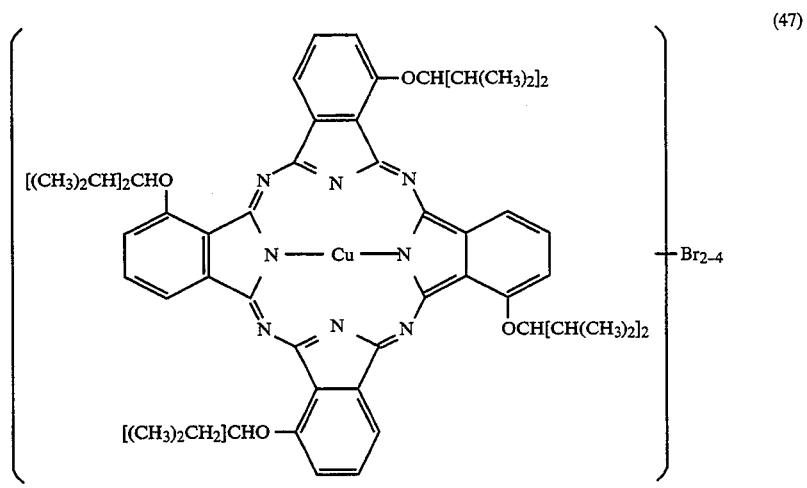
(47)
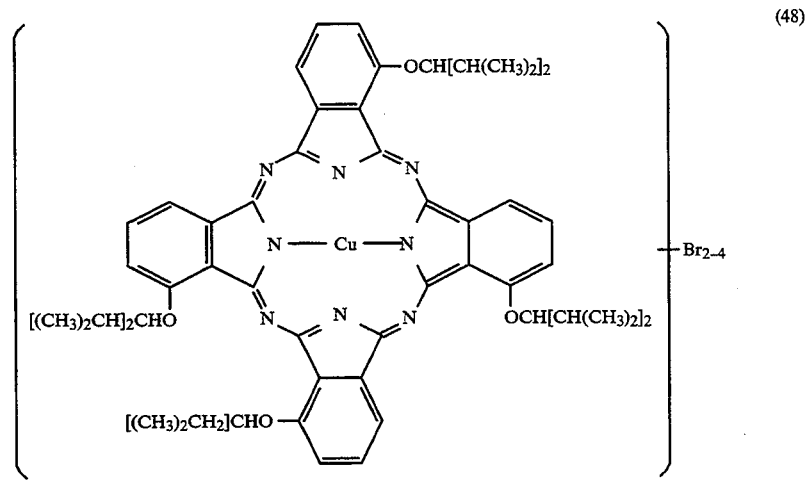
(48)

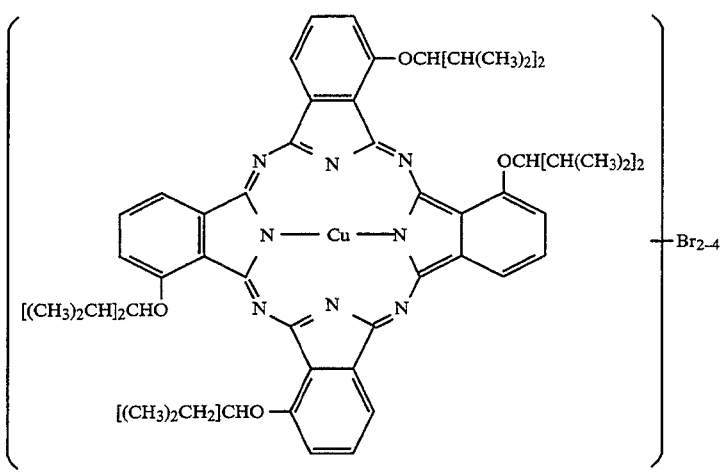

(49)

The mixture had a maximum absorption wave length $\lambda_{max}$ of 715 nm, $\epsilon_{max}$ of $1.6 \times 10^5 g^{-1} cm^2$ and a melting point of 222°–52° C.

Figure 9:
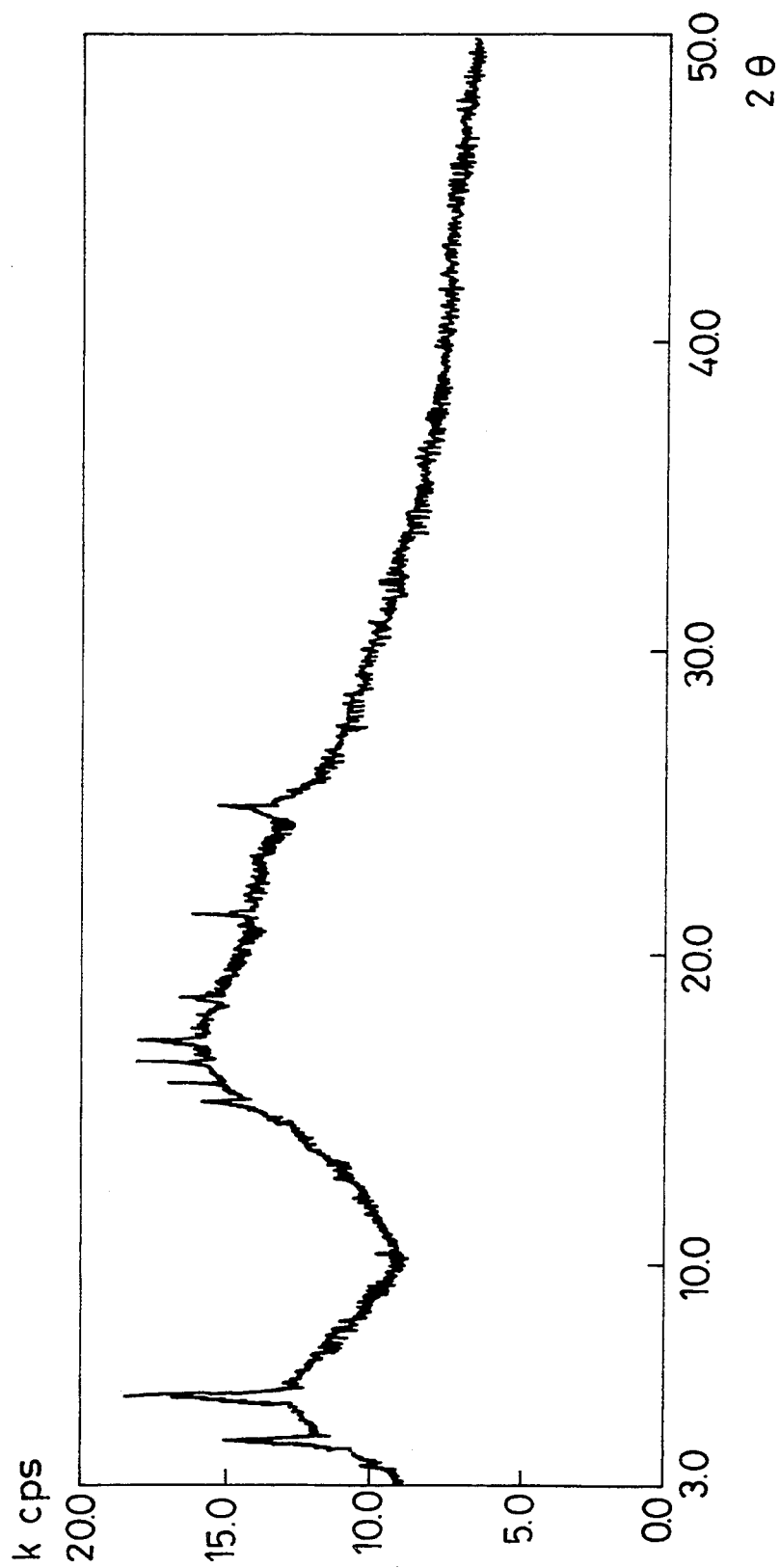
FIG. 9 is an X-ray diffraction pattern of an untreated phthalocyanine in Example 5.
Figure 10:
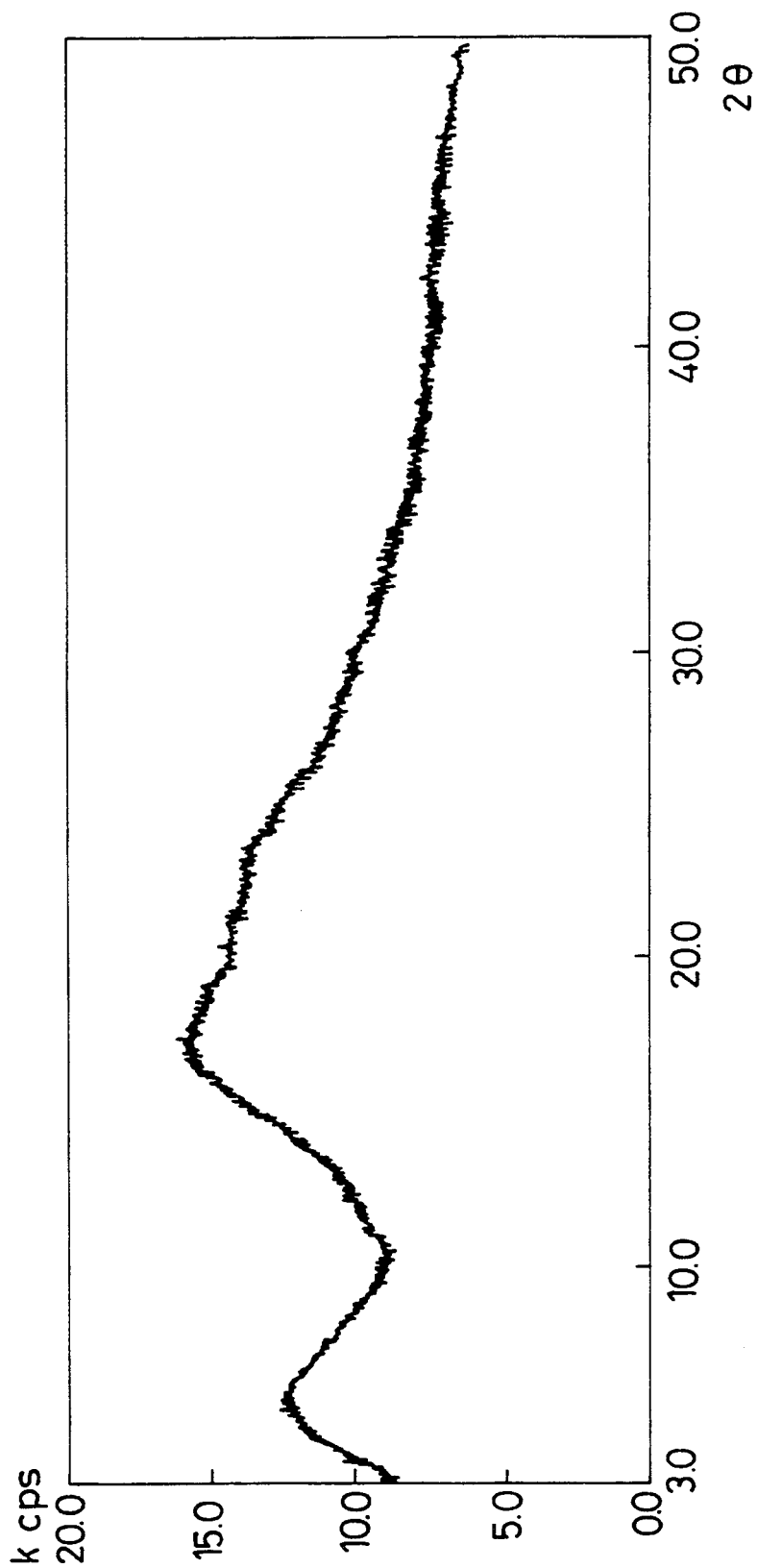
FIG. 10 is an X-ray diffraction pattern of a treated phthalocyanine in Example 5.

20 g of the above-mentioned mixture (X-ray diffraction pattern, FIG. 9) were dissolved in 400 ml of p-xylene, and the solution was then stirred at 100° C. for 2 hours. After cooled to room temperature, the solution was placed in the same freeze-dryer as in Example 1 and then cooled to −40° C. to freeze the solution, and a heating medium for heating shelves in the freeze-dryer was heated up to 30° C. under reduced pressure (240 mTorr). Freezed p-xylene gradually sublimated, and the temperature of the freezed material rose up to 30° C. and settled at 30° C. (at this time, pressure was 140 mTorr). The pressure in the dryer was returned to atmospheric pressure to obtain a p-xylene-free phthalocyanine. This phthalocyanine was dissolved in octane at a concentration of 30 g/l and did not precipitate even after 24 hours. An X-ray diffraction pattern of the treated phthalocyanine is shown in FIG. 10. In this diffraction pattern, a peak was broader than in that of the untreated phthalocyanine, by which it was confirmed that the product was amorphous. In this connection, the untreated phthalocyanine mixture was dissolved in octane at a concentration of 30 g/l, but precipitation took place in 9 hours.

EXAMPLE 6

49.15 g (180 mmol) of diiminoisoindoline represented by the above-mentioned formula (33), 4.45 g (45 mmol) of cuprous chloride, 27.35 g (180 mmol) of DBU and 250 g of n-octyl alcohol were mixed at room temperature, and reaction was then carried out for 5 hours under reflux. Afterward, the solution was cooled to room temperature and then poured into 1000 ml of methanol. Precipitated crystals were collected by filtration and then washed with 500 ml of methanol, followed by drying at 60° C., to obtain 52.8 g of a mixture of isomers represented by the formulae (50), (51), (52) and (53). Yield was 92%. The mixture had a maximum absorption wave length $\lambda_{max}$ of 669 nm and $\epsilon_{max}$ of $2.1 \times 10^5 g^{-1} cm^2$ (toluene). According to an area ratio on a liquid chromatogram, a production ratio of these isomers was (50)/(51)/(52)/(53)=90/5/3/2.

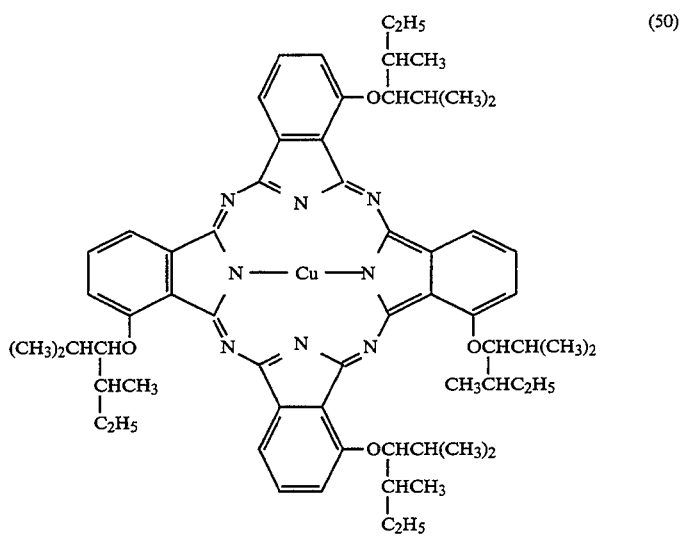

(50)

-continued
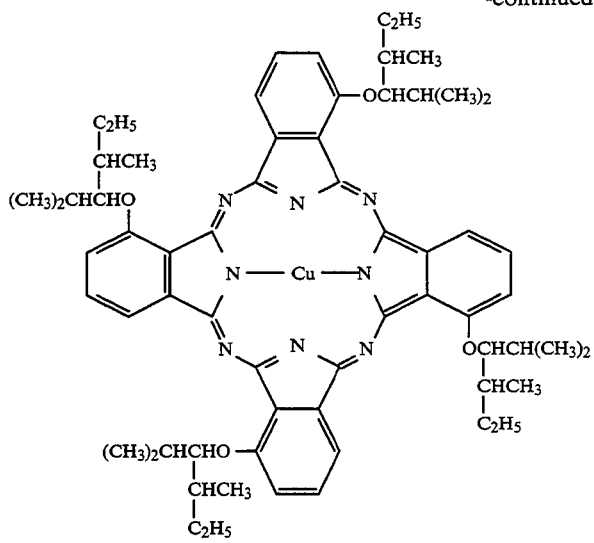
(51)
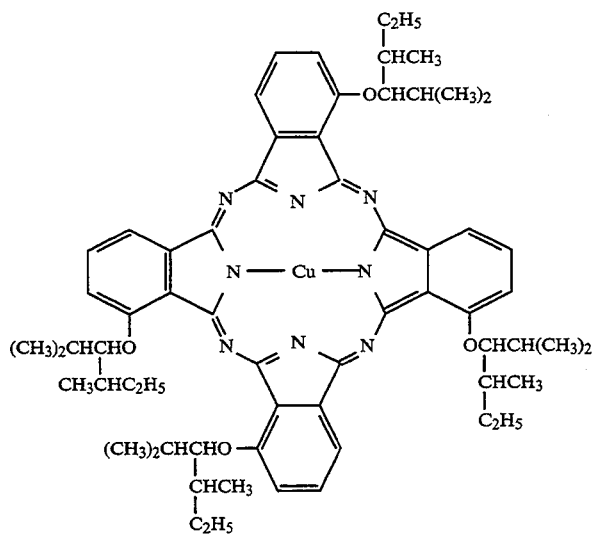
(52)
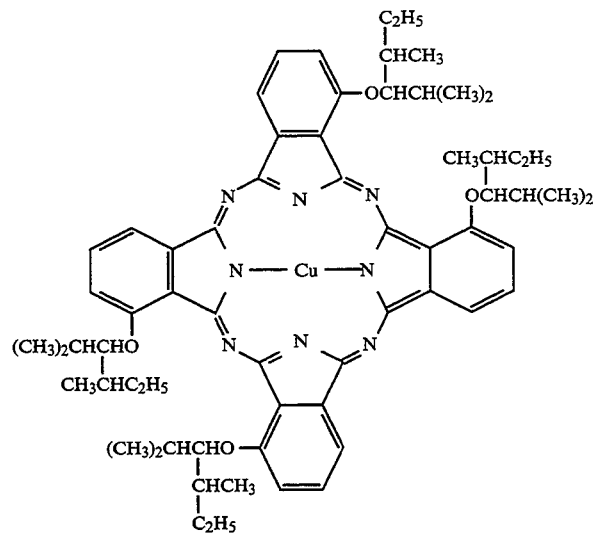
(53)
50 g (44.2 mmol) of the thus obtained phthalocyanine mixture were dissolved in 240 g (150 mmol) of 1,1,2,2-tetrachloroethane, and 100 g (100 ml) of water were then added thereto. Next, a mixture of 27.55 g (172.4 mmol) of bromine and 80 g (50 ml), of 1,1,2,2-tetrachloroethane was added thereto dropwise at 50°–55° C., and reaction was then carried out at 55°–60° C. for 1 hour. Afterward, 125 g of a 10% aqueous sodium hydrogensulfite solution were added to carry out washing. The resultant organic layer was added dropwise to 790 g of methanol, and precipitated crystals were collected by filtration to obtain 62.5 g of a braminated phthalocyanine mixture represented by the following formulae (54), (55), (56) and (57):
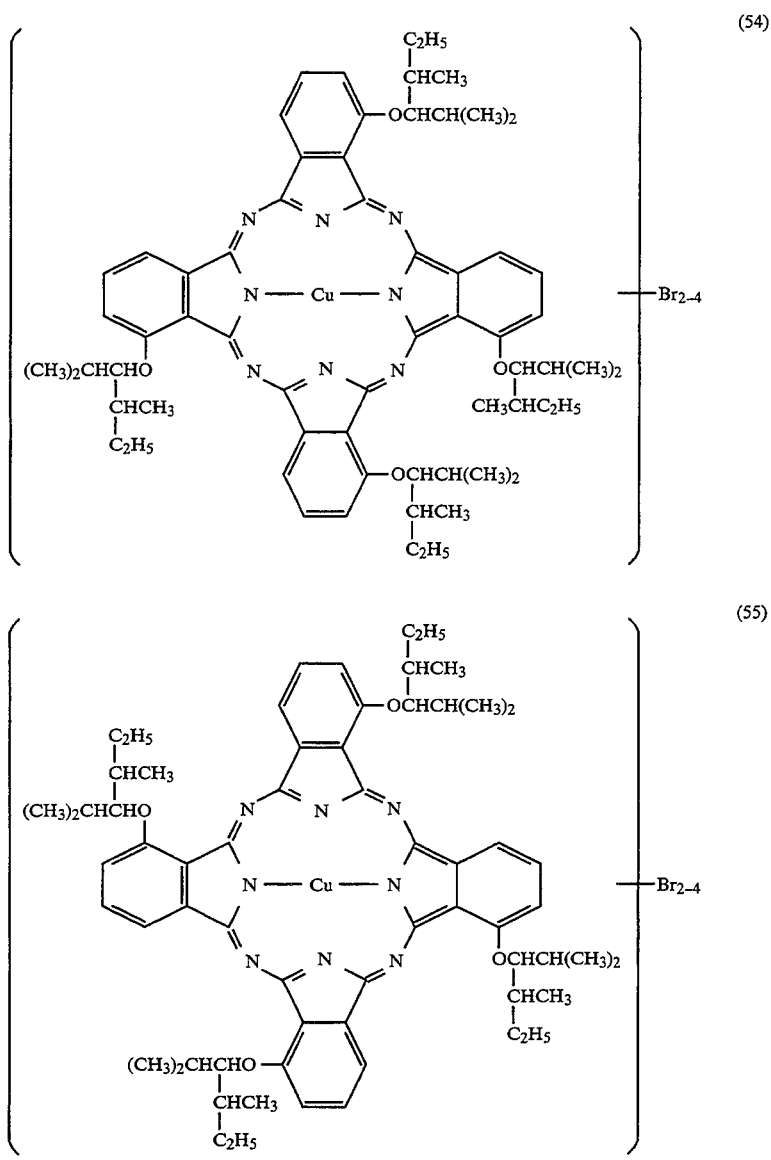

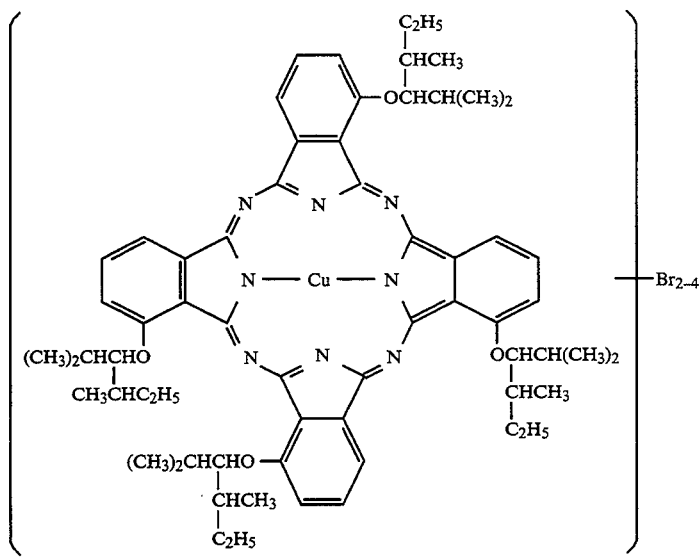

(56)

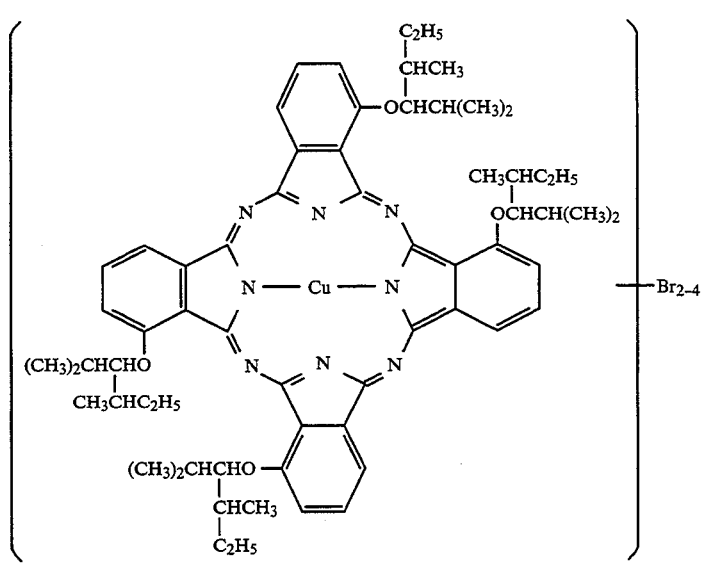

(57)

The mixture had a maximum absorption wave length $\lambda_{max}$ of 712 nm, $\epsilon_{max}$ of $1.4 \times 10^5 g^{31}$ $^1$cm $^2$ and a melting point of 210°–32° C.

Figure 11:
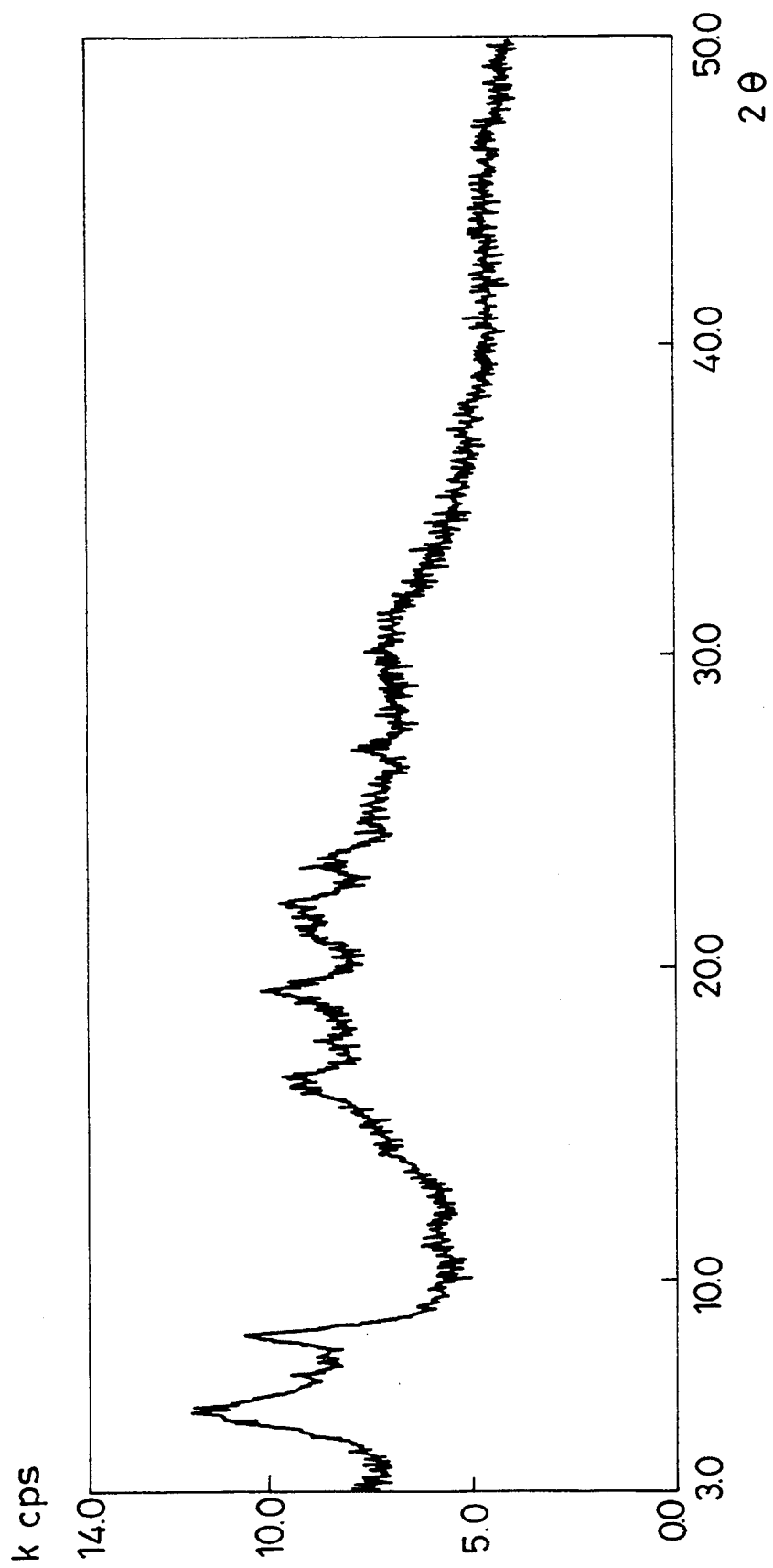
FIG. 11 is an X-ray diffraction pattern of an untreated phthalocyanine in Example 6.
Figure 12:
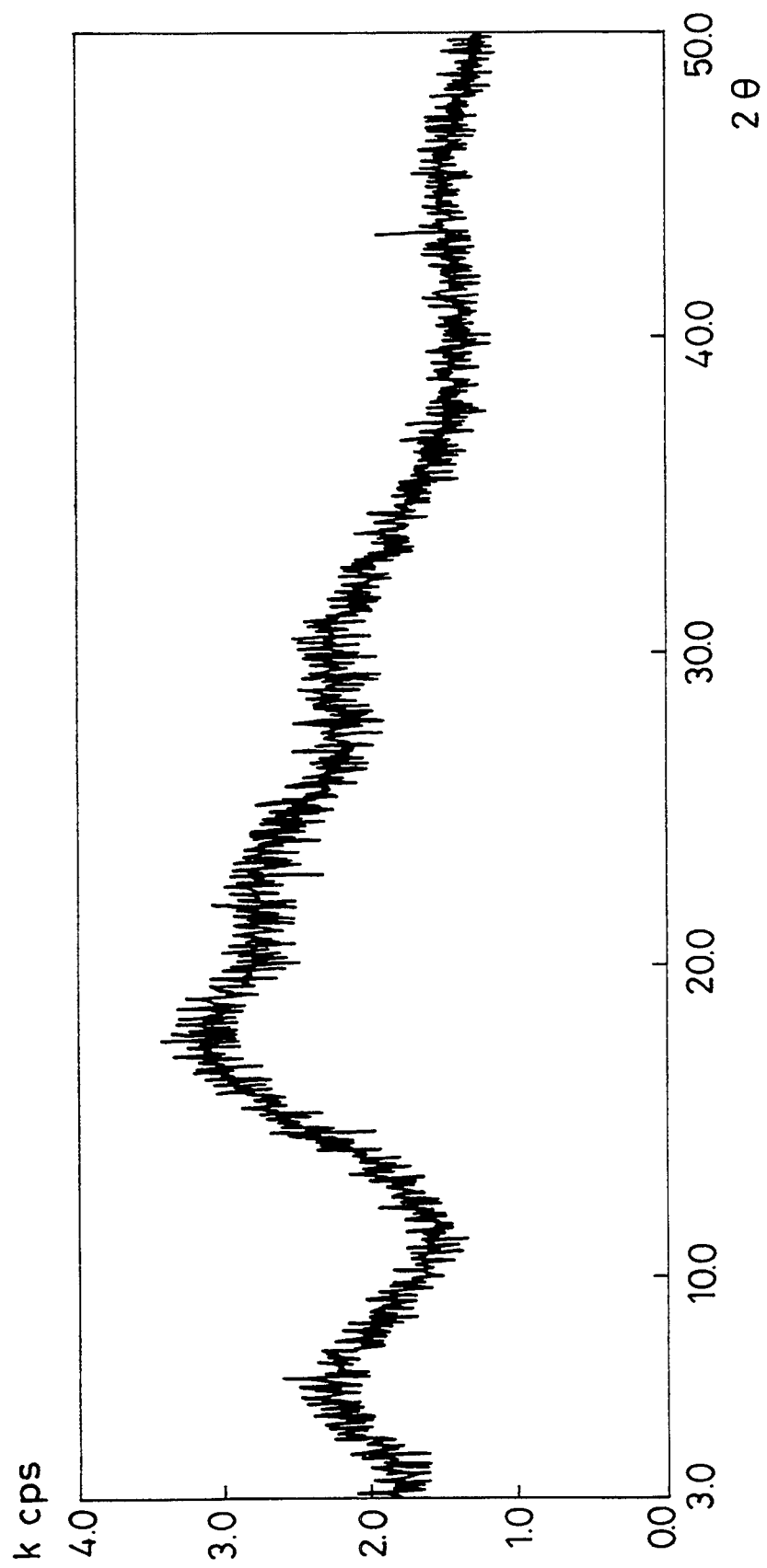
FIG. 12 is an X-ray diffraction pattern of a treated phthalocyanine in Example 6.

40 g of the above-mentioned mixture (X-ray diffraction pattern, FIG. 11) were dissolved in 100 ml of benzene, and the solution was then stirred at 80° C. for 3 hours. After cooled to room temperature, the solution was placed in the same freeze-dryer as in Example 1 and then cooled to −40° C. to freeze the solution, and a heating medium for heating shelves in the freeze-dryer was heated up to 30° C. under reduced pressure (270 mTorr). Freezed benzene gradually sublimated, and the temperature of the freezed material rose up to 28° C. and settled at 28° C. (at this time, pressure was 190 mTorr). The pressure in the dryer was returned to atmospheric pressure to obtain a benzene-free phthalocyanine. This phthalocyanine was dissolved in ethylcyclohexane at a concentration of 30 g/l and did not precipitate even after 24 hours. An X-ray diffraction pattern of the treated phthalocyanine is shown in FIG. 12. In this diffraction pattern, a peak was broader than in that of the untreated phthalocyanine, by which it was confirmed that the product was amorphous. In this connection, the untreated phthalocyanine mixture was dissolved in ethylcyclohexane at a concentration of 30 g/l, but precipitation took place in 9 hours.

EXAMPLE 7

An ethylcyclohexane solution prepared in Example 1 was applied onto a substrate to form a CD-R medium. The formed optical disc had a reflectance of 71%, a linear speed of 1.3 m/s, a sensitivity of 7.6 mW and a block error rate of 18, and it could meet specifications of CR-D.

EXAMPLE 8

Figure 13:
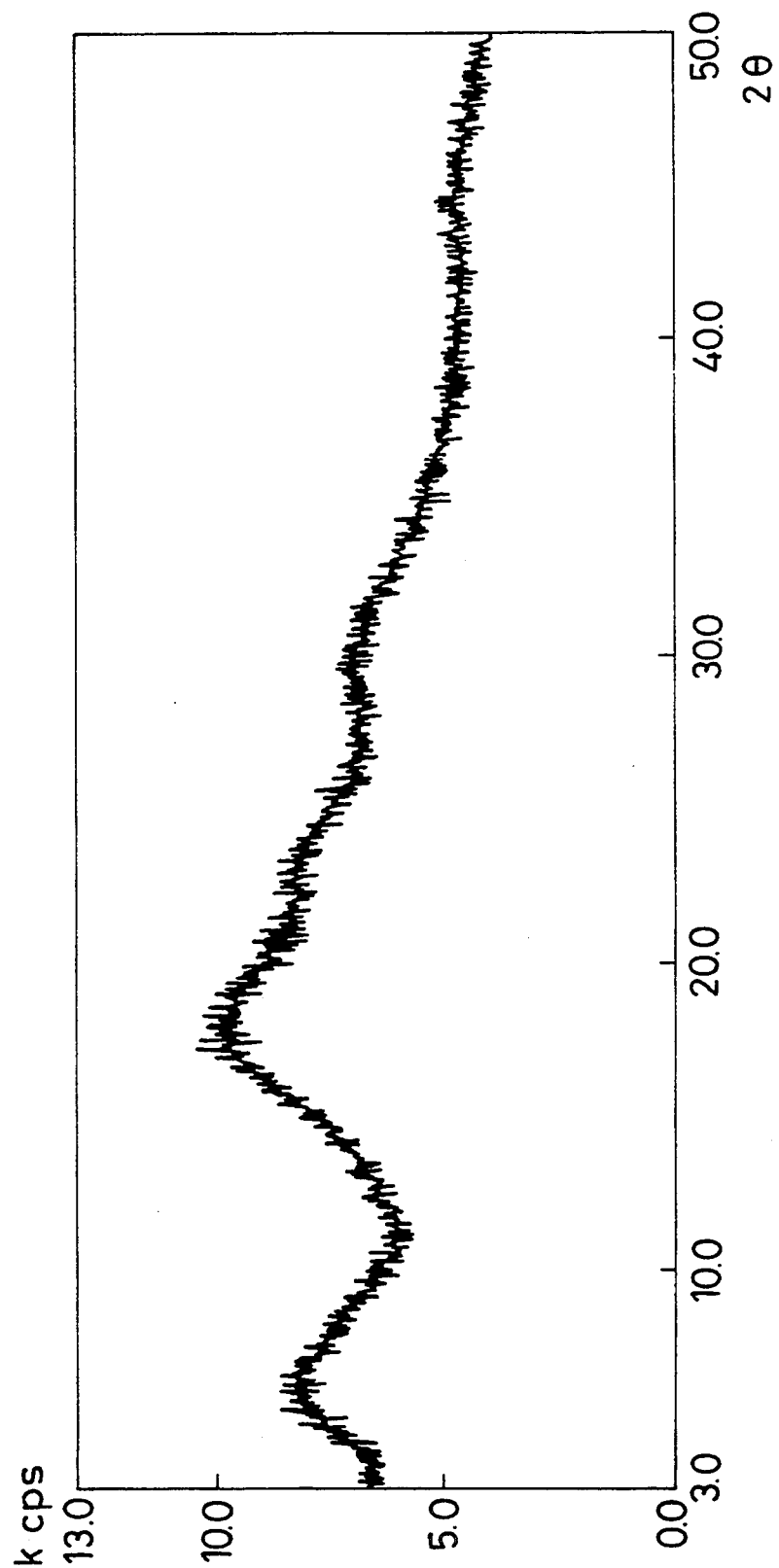
FIG. 13 is an X-ray diffraction pattern of treated phthalocyanine in Example 8.

30 g of an untreated phthalocyanine mixture in Example 1 were dissolved in 600 ml of toluene, and the solution was then stirred at 100° C. for 2 hours. After the solution was cooled to room temperature, the used solvent was distilled off by an evaporator and the resultant residue was then dried at 60° C. The thus treated phthalocyanine was dissolved in ethylcyclohexane at a concentration of 30 g/l and did not precipitate even after 10 hours. An X-ray diffraction pattern of the treated phthalocyanine is shown in FIG. 13. In this diffraction pattern, a peak was broader than in that of the untreated phthalocyanine, by which it was confirmed that the product was amorphous.

EXAMPLE 9

Figure 14:
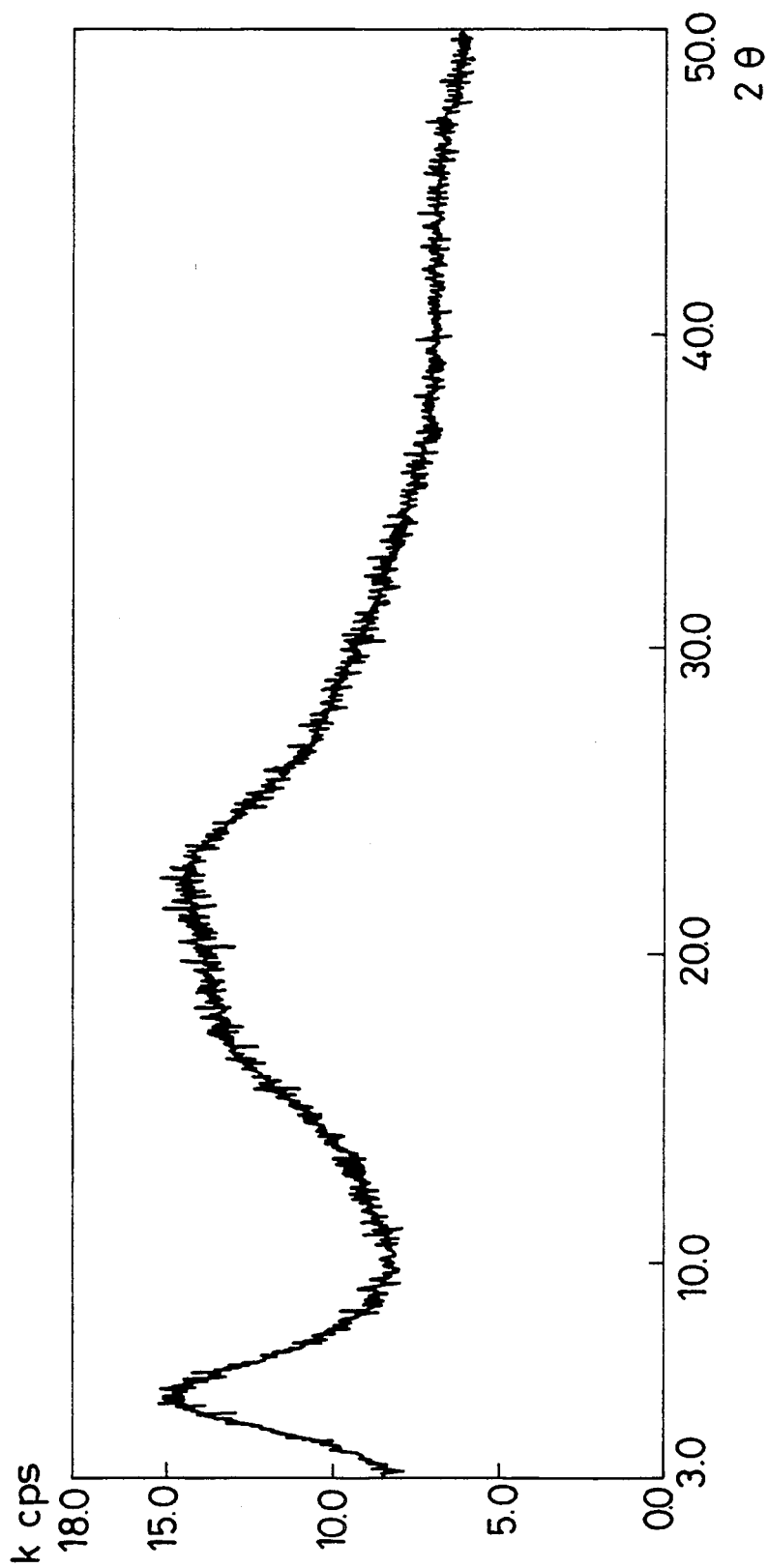
FIG. 14 is an X-ray diffraction pattern of a treated phthalocyanine in Example 9.

20 g of an untreated phthalocyanine mixture in Example 3 were dissolved in 350 ml of ethylbenzene, and the solution was then stirred at 130° C. for 6 hours. After the solution was cooled to room temperature, the used solvent was distilled off by an evaporator and the resultant residue was then dried at 60° C. The thus treated phthalocyanine was dissolved in ethylcyclohexane at a concentration of 30 g/l and did not precipitate even after 12 hours. An X-ray diffraction pattern of the treated phthalocyanine is shown in FIG. 14. In this diffraction pattern, a peak was broader than in that of the untreated phthalocyanine, by which it was confirmed that the product was amorphous.

EXAMPLE 10

Figure 15:
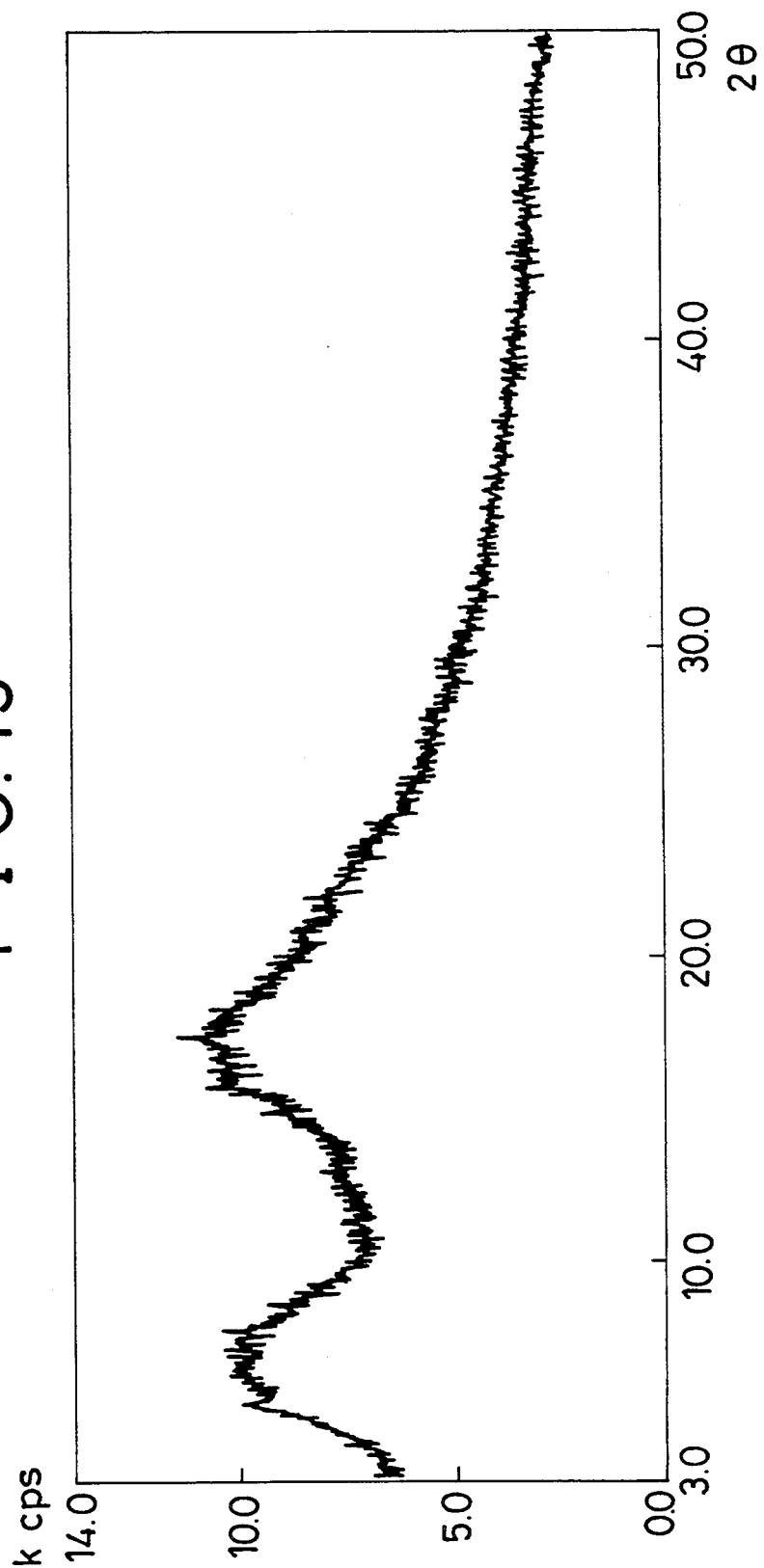
FIG. 15 is an X-ray diffraction pattern of a treated phthalocyanine in Example 10.

10 g of an untreated phthalocyanine mixture in Example 2 were dissolved in 240 ml of isopropylbenzene, and the solution was then stirred at 150° C. for 2 hours. After the solution was cooled to room temperature, the used solvent was distilled off by an evaporator and the resultant residue was then dried at 60° C. . The thus treated phthalocyanine was dissolved in octane at a concentration of 30 g/l and did not precipitate even after 24 hours. An X-ray diffraction pattern of the treated phthalocyanine is shown in FIG. 15. In this diffraction pattern, a peak was broader than in that of the untreated phthalocyanine, by which it was confirmed that the product was amorphous.

EXAMPLE 11

Figure 16:
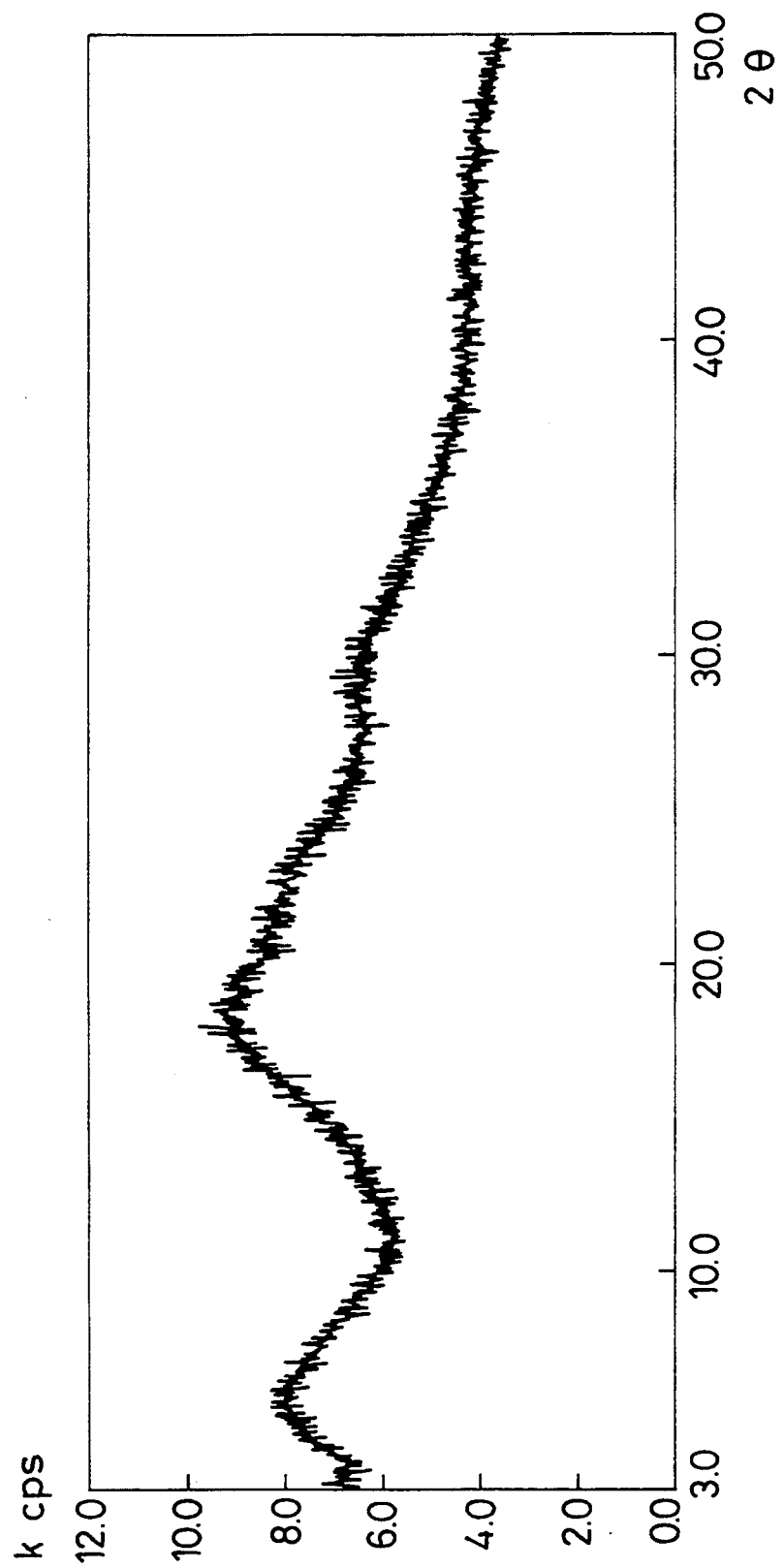
FIG. 16 is an X-ray diffraction pattern of a treated phthalocyanine in Example 11.

10 g of an untreated phthalocyanine mixture in Example 4 were dissolved in 400 ml of xylene, and the solution was then stirred at 135° C. for 2 hours. After the solution was cooled to room temperature, the used solvent was distilled off by an evaporator and the resultant residue was then dried at 60° C. The thus treated phthalocyanine was dissolved in octane at a concentration of 30 g/l and did not change even after 24 hours. An X-ray diffraction pattern of the treated phthalocyanine is shown in FIG. 16. In this diffraction pattern, a peak was broader than in that of the untreated phthalocyanine, by which it was confirmed that the product was amorphous.

EXAMPLE 12

Figure 17:
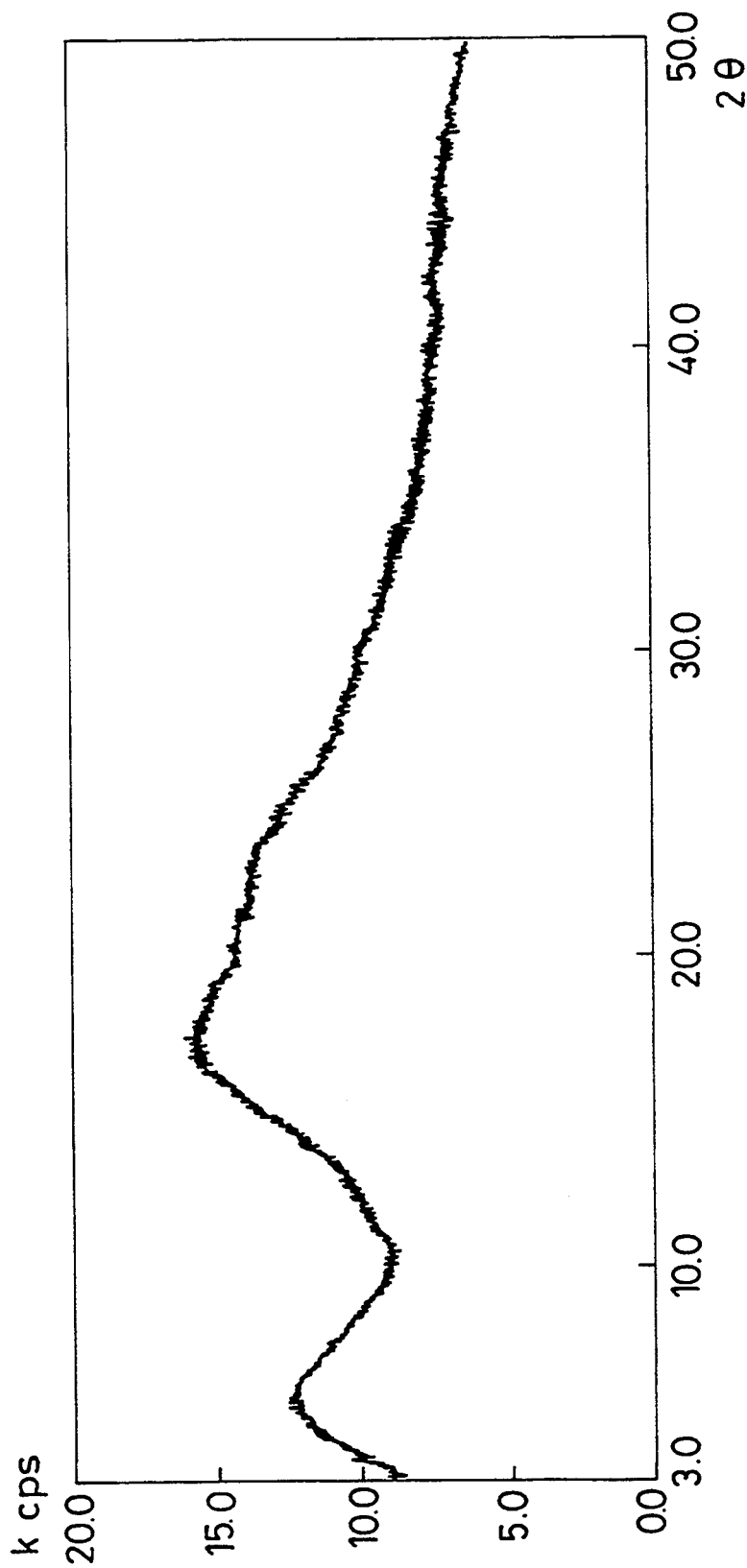
FIG. 17 is an X-ray diffraction pattern of a treated phthalocyanine in Example 12.

20 g of an untreated phthalocyanine mixture in Example 5 were dissolved in 800 ml of xylene, and the solution was then stirred at 135° C. for 2 hours. After the solution was cooled to room temperature, the used solvent was distilled off by an evaporator and the resultant residue was then dried at 60° C. . The thus treated phthalocyanine was dissolved in octane at a concentration of 30 g/l, and the formation of a precipitate was not observed even after 24 hours. An X-ray diffraction pattern of the treated phthalocyanine is shown in FIG. 17. In this diffraction pattern, a peak was broader than in that of the untreated phthalocyanine, by which it was confirmed that the product was amorphous,

EXAMPLE 13

An ethylcyclohexane solution prepared in Example 8 was applied onto a polycarbonate substrate to form a CD-R medium. The formed medium had a reflectance of 71%, a linear speed of 1.3 m/s, a sensitivity of 7.6 mW and a block error rate of 17, and it could meet specifications of CR-D.

EXAMPLE 14

10 g of phthalonitrile represented by the following formula (58), 2 g of palladium chloride, 4 g of DBU and 200 g of n-amyl alcohol were mixed, and the mixture was then reacted at 95° C. for 24 hours.

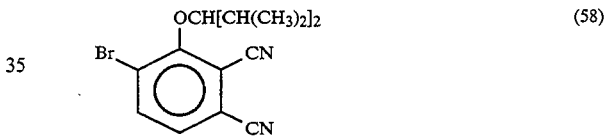

(58)

The reaction mixture was poured into 1000 ml of methanol, and a precipitated tar was separated and purified by a column chromatography to obtain 2 g of a compound (59), 2 g of a compound (60), 0.5 g of a compound (61) and 0.5 g of a compound (62). Physical properties of the respective compounds are set forth in the following Table 1.

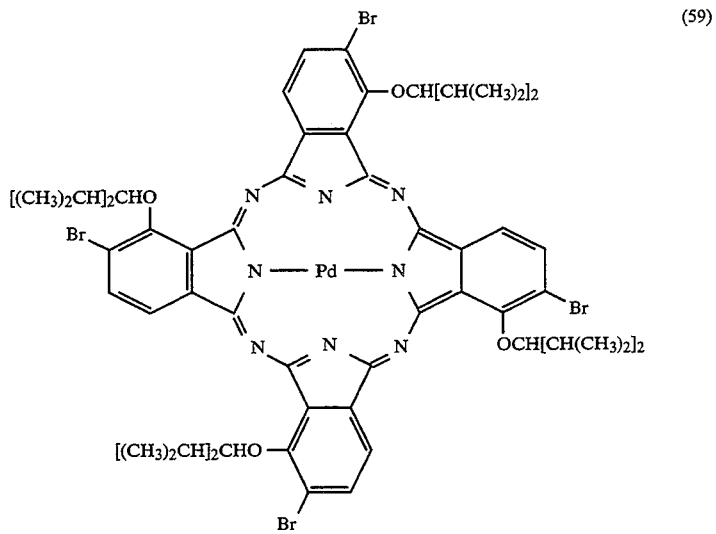

(59)

-continued
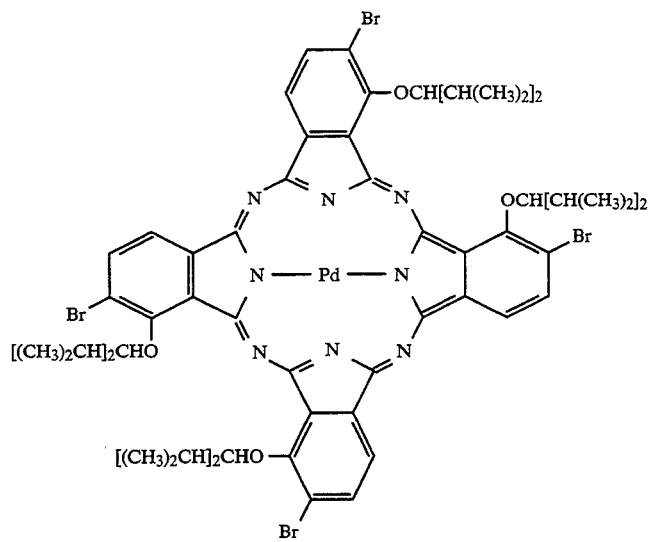
(60)
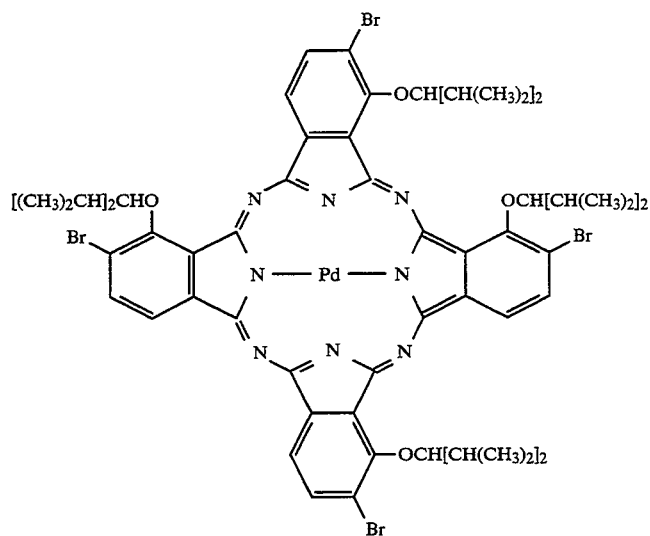
(61)
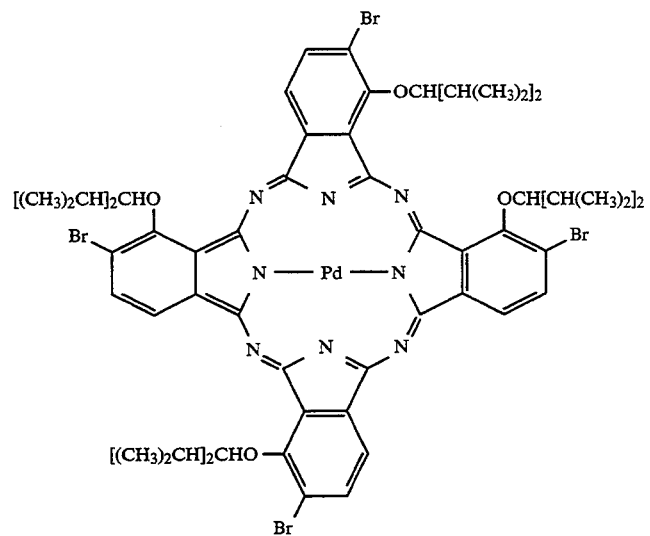
(62)

TABLE 1

| Compound No. | $\lambda_{max}$ (nm) ($\epsilon_{max} \times 10^{-5}$) | mass (m/e) | Elemental Analysis (C, H, N) Found (Calcd.) | | |
|---|---|---|---|---|---|
| 59 | 715 (2.2) | 1391 | 51.82 (51.80) | 4.91 4.93 | 8.03 8.05) |
| 60 | 716 (2.2) | 1391 | 51.78 (51.80) | 4.90 4.93 | 8.06 8.05) |
| 61 | 715 (2.1) | 1391 | 51.82 (51.80) | 4.94 4.93 | 8.03 8.05) |
| 62 | 716 (2.2) | 1391 | 51.81 (51.80) | 4.91 4.93 | 8.07 8.05) |

Figure 18:
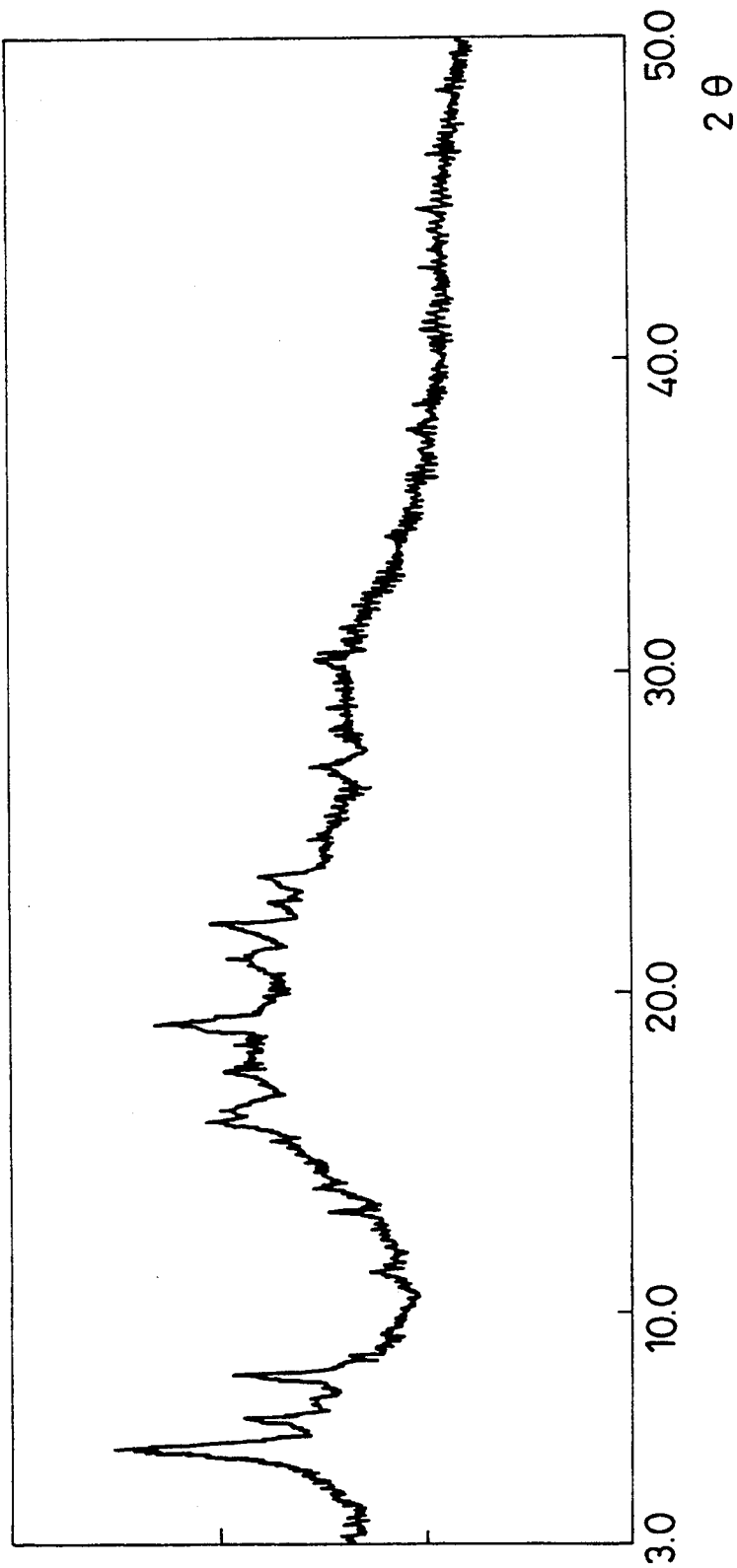
FIG. 18 is an X-ray diffraction pattern of an untreated phthalocyanine in Example 14.
Figure 19:
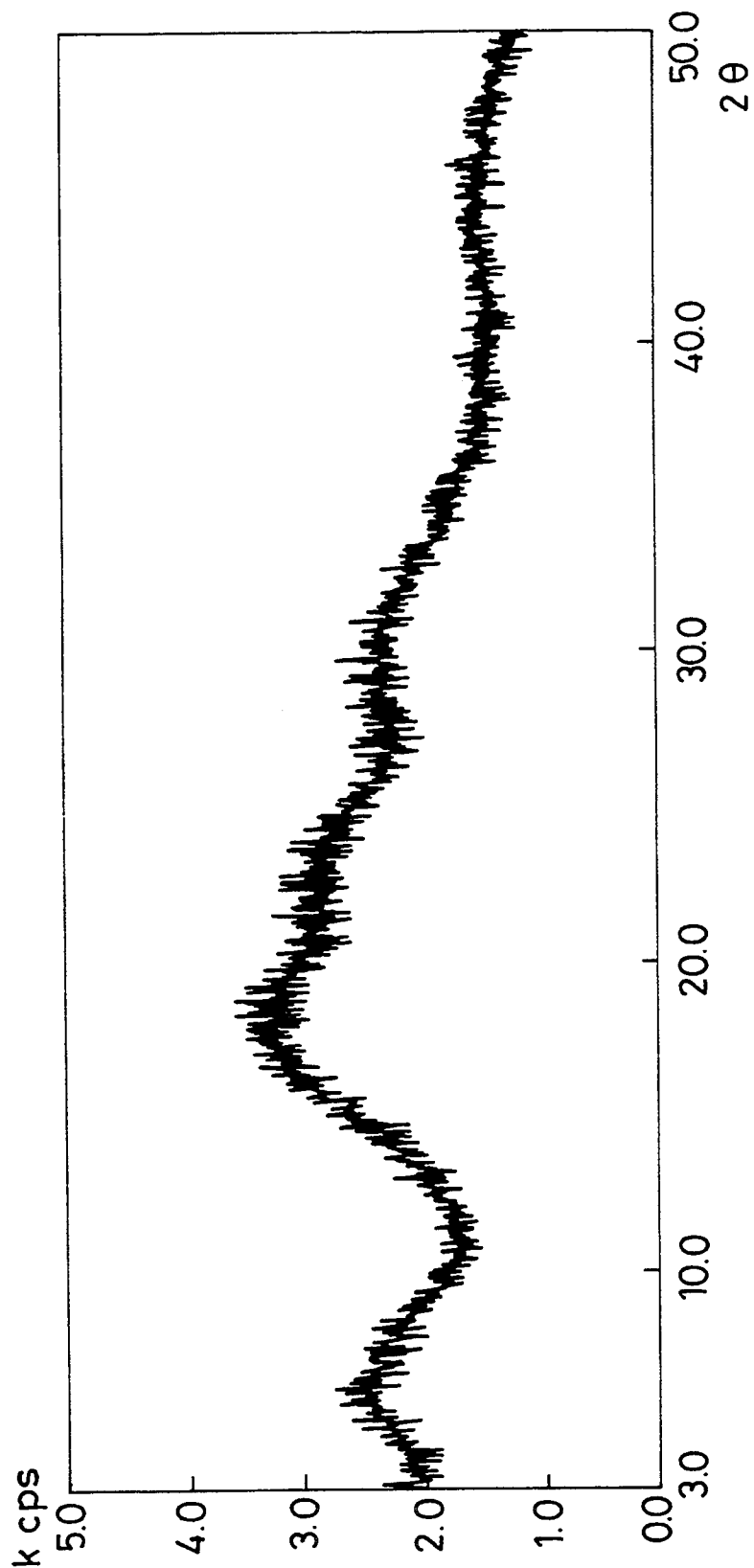
FIG. 19 is an X-ray diffraction pattern of a treated phthalocyanine in Example 14.

2 g of the compound represented by the formula (59) (X-ray diffraction pattern, FIG. 18) were dissolved in 50 ml of p-xylene, and the solution was then stirred at 100° C. for 2 hours. After cooled to room temperature, the solution was placed in the same freeze-dryer as in Example 1 and then cooled to −40° C. to freeze the solution, and a heating medium for heating shelves in the freeze-dryer was heated up to 30° C. under reduced pressure (240 mTorr). Freezed p-xylene gradually sublimated, and the temperature of the freezed material rose up to 30° C. and settled at 30° C. (at this time, pressure was 130 mTorr). The pressure in the dryer was returned to atmospheric pressure to obtain a p-xylene-free phthalocyanine. The treated phthalocyanine was dissolved in dimethylcyclohexane at a concentration of 30 g/l, and the formation of a precipitate was not observed even after 24 hours. An X-ray diffraction pattern of the treated phthalocyanine is shown in FIG. 19. In this diffraction pattern, a peak was broader than in that of the untreated phthalocyanine, by which it was confirmed that the product was amorphous. In this connection, the untreated phthalocyanine mixture was dissolved in dimethylcyclohexane at a concentration of 30 g/l, but precipitation took place in 8 hours.

EXAMPLE 15

Figure 20:
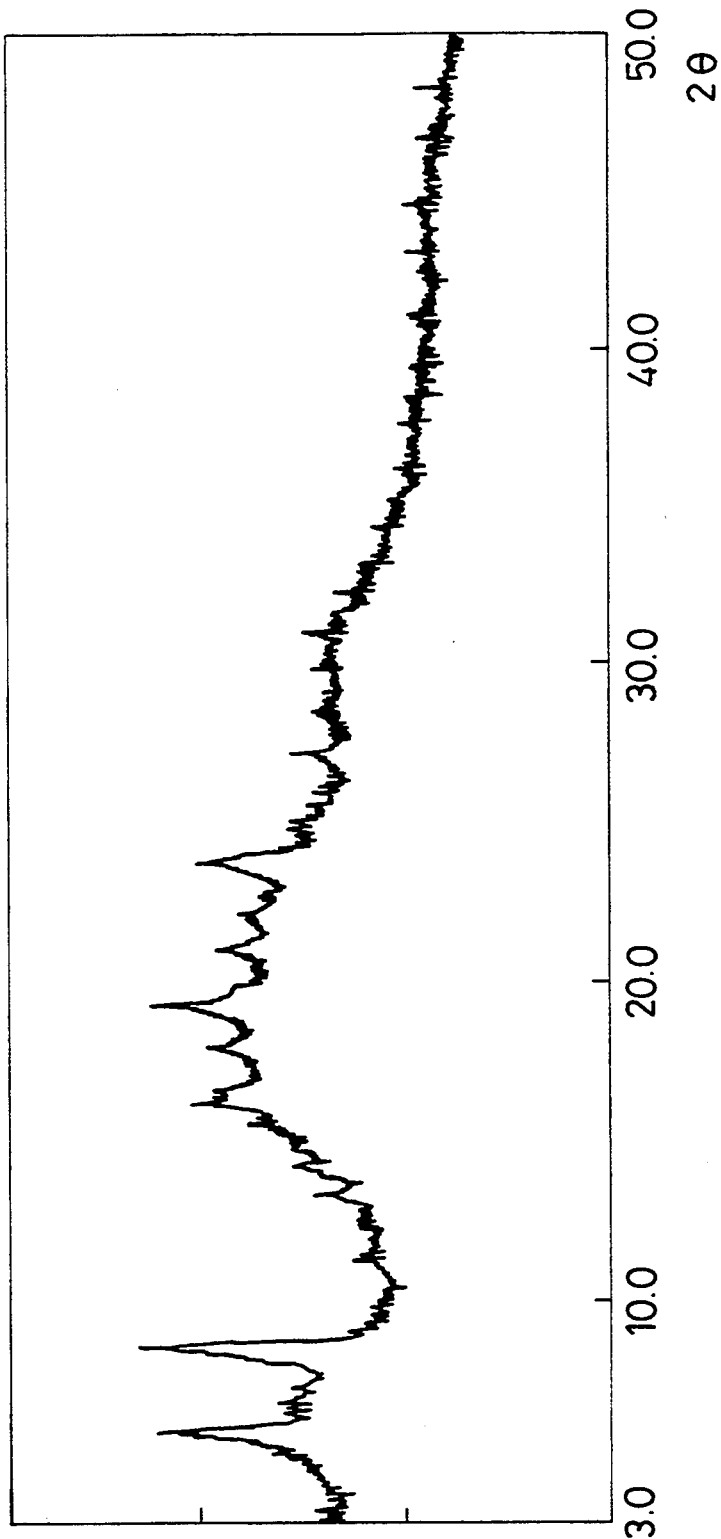
FIG. 20 is an X-ray diffraction pattern of an untreated mixture obtained in Example 14.
Figure 21:
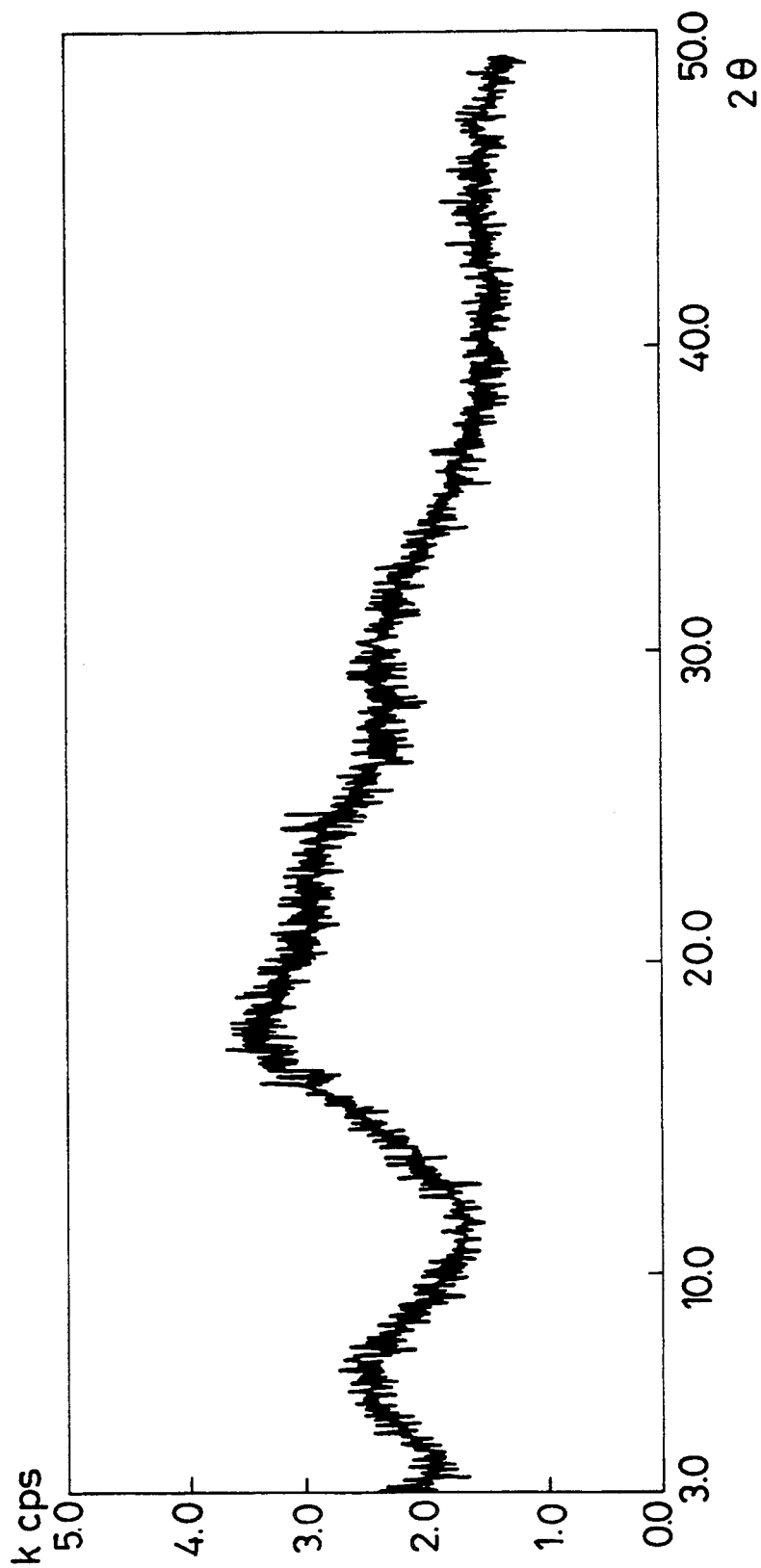
FIG. 21 is an X-ray diffraction pattern of a treated phthalocyanine in Example 15.

5 g of a mixture (X-ray diffraction pattern, FIG. 20) of isomers (59) to (62) obtained in Example 14 were dissolved in 100 ml of toluene, and the solution was then stirred at 100° C. for 2.5 hours. After the solution was cooled to room temperature, the used solvent was distilled off by an evaporator and the resultant residue was then dried at 60° C. . The thus treated phthalocyanine was dissolved in octane at a concentration of 30 g/l, and the formation of a precipitate was not observed even after 24 hours. An X-ray diffraction pattern of the treated phthalocyanine is shown in FIG. 21. In this diffraction pattern, a peak was broader than in that of the untreated phthalocyanine, by which it was confirmed that the product was amorphous.

EXAMPLE 16

5 g of phthalonitrile represented by the above-mentioned formula (58), 5 g of phthalonitrile represented by the following formula (63), 2 g of palladium chloride, 4 g of DBU and 200 g of n-amyl alcohol were mixed, and the mixture was then reacted at 95° C. for 24 hours.

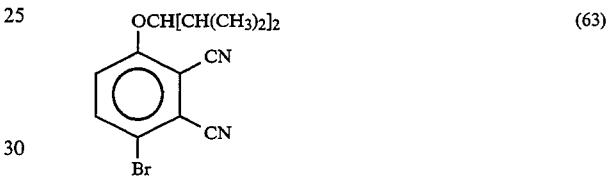
(63)

The reaction mixture was poured into 1000 ml of methanol, and a precipitated tar was separated and purified by a column chromatography to obtain 0.1 g of a compound (64), 0.1 g of a compound (65), 0.5 g of a compound (66) and 0.3 g of a compound (67). Physical properties of the respective isomers are set forth in the following Table 2.

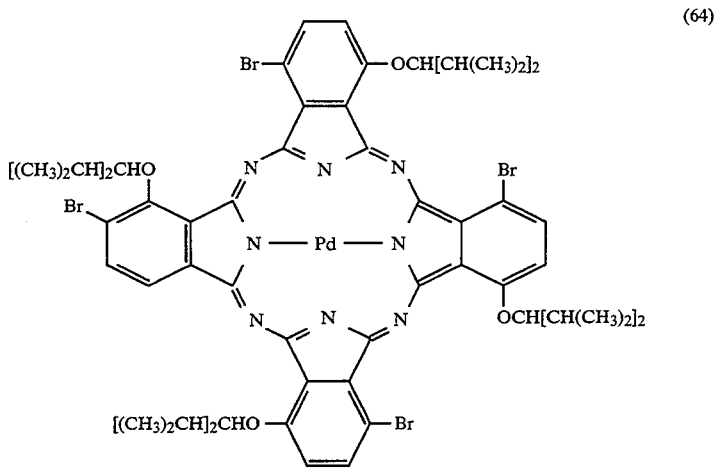
(64)

-continued
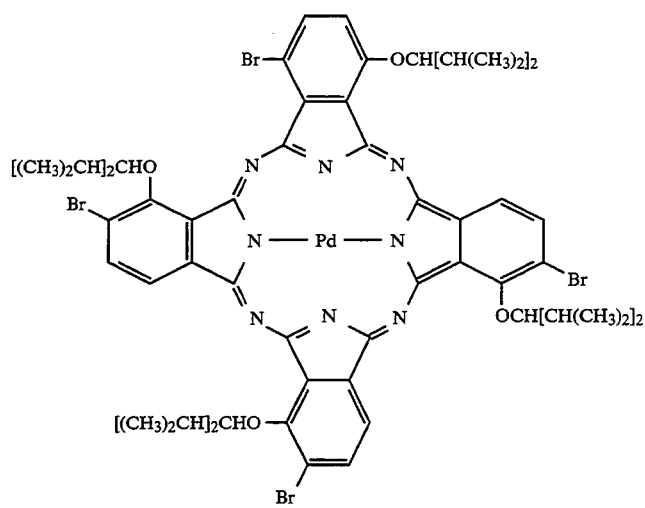
(65)
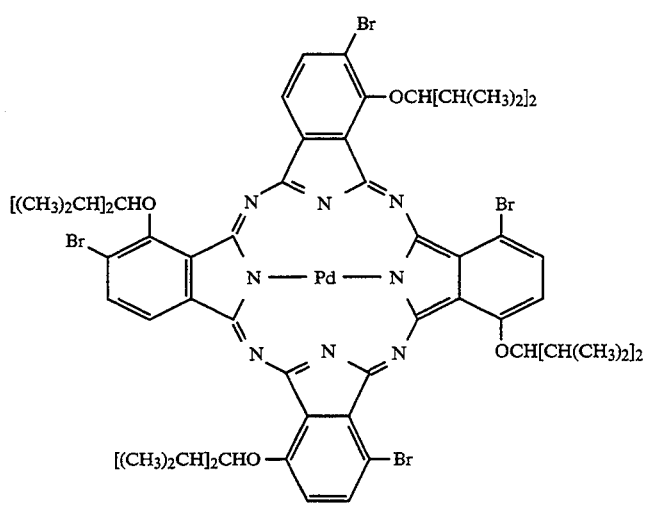
(66)
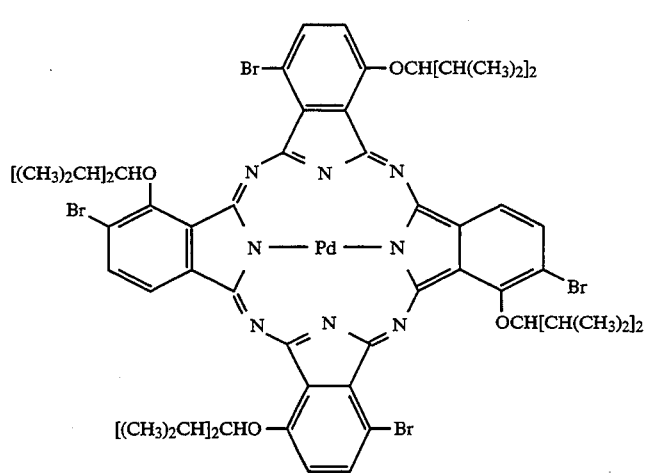
(67)
| | TABLE 2 | | | | |
|---|---|---|---|---|---|
| Compound No. | $\lambda_{max}$ (nm) ($\epsilon_{max} \times 10^{-5}$) | mass (m/e) | Elemental Analysis (C, H, N) Found (Calcd.) | | |
| 64 | 716 (2.2) | 1391 | 51.67 (51.80) | 4.95 (4.93) | 8.10 (8.05) |
| 65 | 716 (2.2) | 1391 | 51.90 (51.80) | 4.88 (4.93) | 7.99 (8.05) |
| 66 | 716 (2.2) | 1391 | 51.85 (51.80) | 4.87 (4.93) | 8.11 (8.05) |
| 67 | 715 (2.2) | 1391 | 51.78 (51.80) | 4.87 (4.93) | 7.99 (8.05) |

Figure 22:
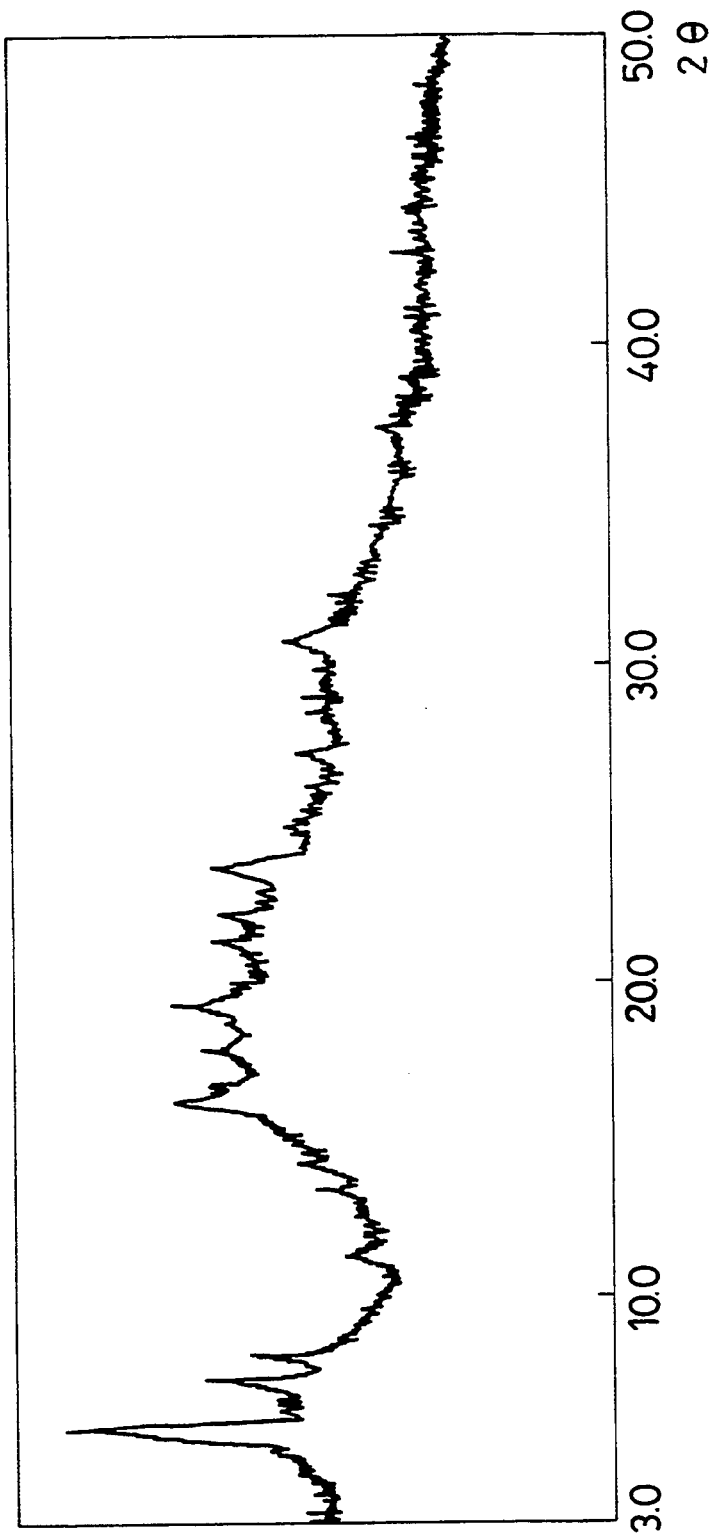
FIG. 22 is an X-ray diffraction pattern of an untreated phthalocyanine in Example 16.
Figure 23:
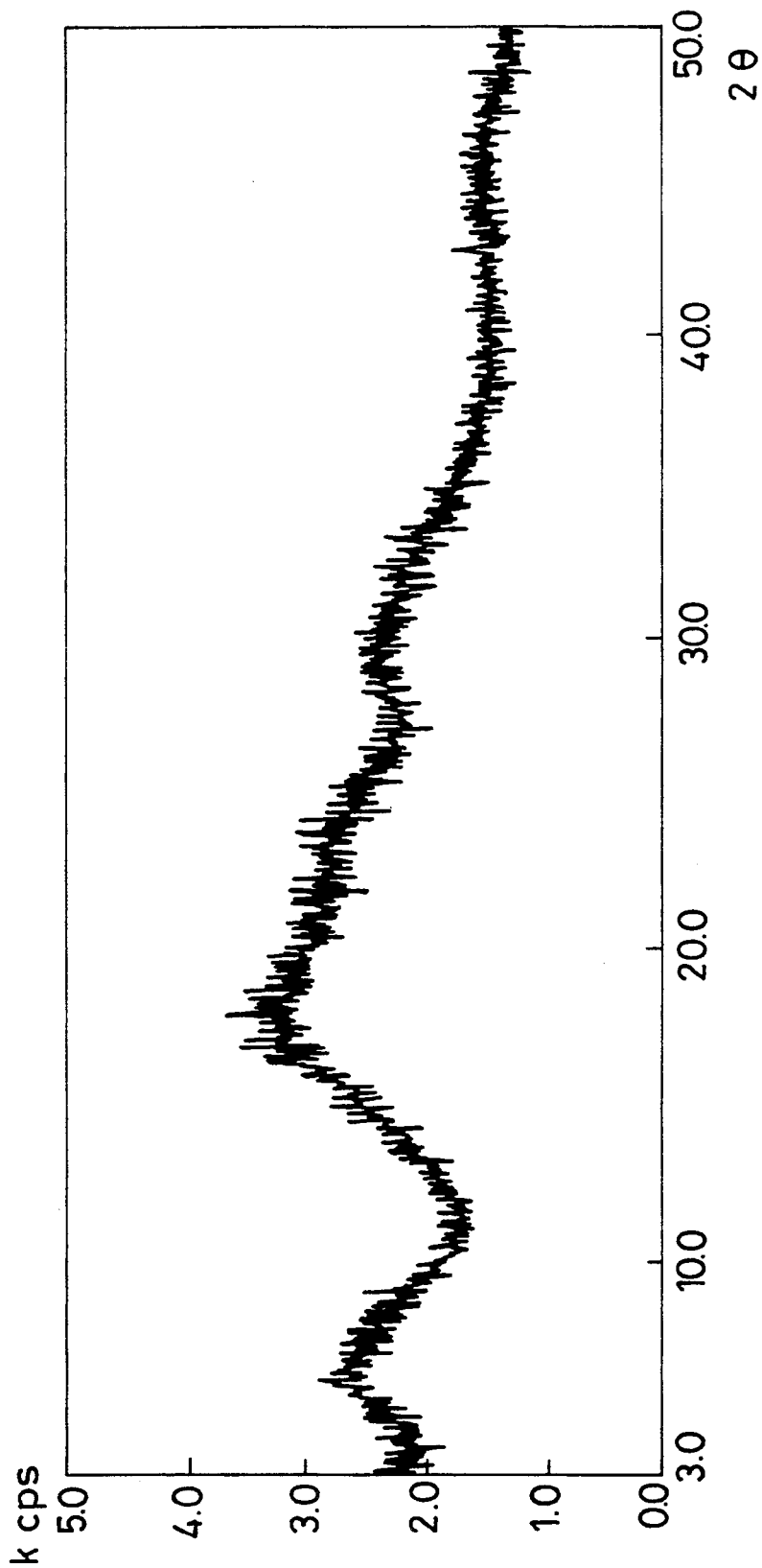
FIG. 23 is an X-ray diffraction pattern of a treated phthalocyanine in Example 16.

1 g of the above-mentioned mixture (X-ray diffraction pattern, FIG. 22) was dissolved in 20 ml of p-xylene, and the solution was then stirred at 100° C. for 2 hours. After cooled to room temperature, the solution was placed in the same freeze-dryer as in Example 1 and then cooled to −40° C. to freeze the solution, and a heating medium for heating shelves in the freeze-dryer was heated up to 30° C. under reduced pressure (260 mTorr). Freezed p-xylene gradually sublimated, and the temperature of the freezed material rose up to 28° C. and settled at 28° C. (at this time, pressure was 130 mTorr). The pressure in the dryer was returned to atmospheric pressure to obtain a p-xylene-free phthalocyanine. The treated phthalocyanine was dissolved in dimethylcyclohexane at a concentration of 30 g/l, and the formation of a precipitate was not observed even after 24 hours. An X-ray diffraction pattern of the treated phthalocyanine is shown in FIG. 23. In this diffraction pattern, a peak was broader than in that of the untreated phthalocyanine, by which it was confirmed that the product was amorphous. In this connection, the untreated phthalocyanine was dissolved in dimethylcyclohexane at a concentration of 30 g/l, but precipitation took place in 9 hours.

What is claimed is:

1. An amorphous alkoxyphthalocyanine which is a compound or a mixture of compounds represented by the formula (1)

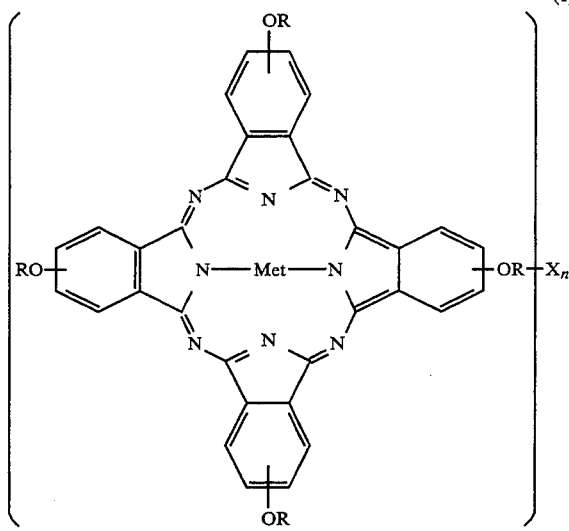

wherein R is a branched alkyl group; X is a halogen atom; n is the number of X and from 0 to 4; and Met is a divalent metal atom, a trivalent or a tetravalent metallic derivative or an oxy metal, said compound or mixture of compounds having good solubility in an organic solvent suitable for use in a spin coating.

2. A method for preparing an amorphous alkoxyphthalocyanine which is a compound or a mixture of compounds represented by the formula (1)

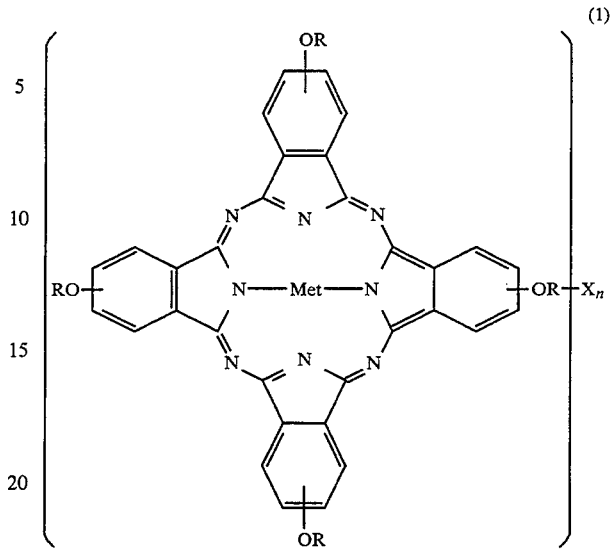

wherein R is a branched alkyl group; X is a halogen atom; n is the number of X and from 0 to 4; and Met is a divalent metal atom, a trivalent or a tetravalent metallic derivative or an oxy metal, said compound or mixture of compounds having good solubility in an organic solvent suitable for use in a spin coating, which method comprises the step of heating a crystalline phthalocyanine compound or a mixture of crystalline phthalocyanine compounds in an organic solvent suitable for a heat treatment.

3. The method for preparing an amorphous alkoxyphthalocyanine according to claim 2 wherein after the heating in said organic solvent suitable for the heat treatment, this solvent is distilled off.

4. The method for preparing an amorphous alkoxyphthalocyanine according to claim 3 wherein the organic solvent is an aromatic organic solvent.

5. The method for preparing an amorphous alkoxyphthalocyanine according to claim 4 wherein a heating temperature in the organic solvent is in the range of from 50° to 250° C.

6. The method for preparing an amorphous alkoxyphthalocyanine according to claim 5 wherein the solvent is distilled off under reduced pressure.

7. The method for preparing an amorphous alkoxyphthalocyanine according to claim 6 wherein the organic solvent is toluene, ethylbenzene or xylene.

8. The method for preparing an amorphous alkoxyphthalocyanine according to claim 2 wherein after the heating in said organic solvent, suitable for the heat treatment, the organic solvent is freeze-dried.

9. The method for preparing an amorphous alkoxyphthalocyanine according to claim 8 wherein the freezing point of the organic solvent for use in the freeze-drying step is from −40° to 40° C.

10. The method for preparing an amorphous alkoxyphthalocyanine according to claim 9 wherein a heating temperature is from 50° to 250° C.

11. The method for preparing an amorphous alkoxyphthalocyanine according to claim 9 wherein the freezing temperature is from −50° to 0° C.

12. The method for preparing an amorphous alkoxyphthalocyanine according to claim 9 wherein a temperature of a heating medium for heating shelves in the freeze-dryer after the freezing is from −30° to 70° C.

13. The method for preparing an amorphous alkoxyphthalocyanine according to claim 12 wherein the temperature of the heating medium for heating shelves in the freeze-dryer after the freezing is from 0° to 70° C.

14. The method for preparing an amorphous alkoxyphthalocyanine according to claim 9 wherein a pressure at the time of the drying is from 1000 mTorr or less.

15. The method for preparing an amorphous alkoxyphthalocyanine according to claim 14 wherein the pressure during the final step of the drying process is 200 mTorr or less.

16. The method for preparing an amorphous alkoxyphthalocyanine according to claim 9 wherein the organic solvent is benzene or p-xylene.

17. The amorphous alkoxyphthalocyanine according to claim 1, wherein said compound is completely dissolvable in 2 to 500 times by weight of said organic solvent.

18. The method for preparing an amorphous alkoxyphthalocyanine according to claim 2 wherein said compound is completely dissolvable in 2 to 500 times by weight of said organic solvent suitable for use in spin coating.

19. The amorphous alkoxyphthalocyanine according to claim 1, wherein said organic solvent is selected from the group consisting of saturated hydrocarbons, ethers and halogenated hydrocarbons.

20. The method for preparing an amorphous alkoxyphthalocyanine according to claim 2 wherein said organic solvent suitable for use in a spin coating is selected from the group consisting of saturated hydrocarbons, ethers and halogenated hydrocarbons.

21. The amorphous alkoxyphthalocyanine according to claim 19, wherein said organic solvents are selected from the group consisting of n-hexane, n-pentane, n-octane, cyclohexane, methylcyclohexane, ethylcyclohexane, dimethylcyclohexane, tetrahydrofuran, n-butyl ether, n-propyl ether, isopropyl ether, carbon tetrachloride, chloroform, dichloromethane, 1,1,1-trichloroethane, 1,1,2-trichloroethane, and 1,1,2,2-tetrachloroethane.

22. The method according to claim 20, wherein said organic solvent is selected from the group consisting of n-hexane, n-pentane, n-octane, cyclohexane, methylcyclohexane, ethylcyclohexane, dimethylcyclohexane, tetrahydrofuran, n-butyl ether, n-propyl ether, isopropyl ether, carbon tetrachloride, chloroform, dichloromethane, 1,1,1-trichloroethane, 1,1,2-trichloroethane, and 1,1,2,2-tetrachloroethane.

* * * * *